US006557752B1

(12) United States Patent
Yacoob

(10) Patent No.: US 6,557,752 B1
(45) Date of Patent: *May 6, 2003

(54) SMART CARD FOR RECORDING IDENTIFICATION, AND OPERATIONAL, SERVICE AND MAINTENANCE TRANSACTIONS

(75) Inventor: Yaser Yacoob, Bethesda, MD (US)

(73) Assignee: Q-International, Inc., Fairfax, VA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 883 days.

(21) Appl. No.: 08/661,899

(22) Filed: Jun. 12, 1996

(51) Int. Cl.[7] .............................................. G06F 17/00
(52) U.S. Cl. ...................................... 235/375; 235/385
(58) Field of Search ...................... 902/26, 27; 235/375, 235/380, 381, 383, 492, 385

(56) References Cited

U.S. PATENT DOCUMENTS

| | | | | |
|---|---|---|---|---|
| 4,159,531 A | * | 6/1979 | McGrath | 364/900 |
| 4,709,137 A | * | 11/1987 | Yoshida | 902/26 |
| 4,737,911 A | * | 4/1988 | Freman, Jr. | 902/27 |
| 5,038,025 A | * | 8/1991 | Kodera | 902/26 |
| 5,049,728 A | * | 9/1991 | Rovin | 235/492 |
| 5,058,044 A | * | 10/1991 | Stewart et al. | 364/551.01 |
| 5,072,380 A | * | 12/1991 | Randelman et al. | 235/383 |
| 5,289,369 A | * | 2/1994 | Hirshberg | 364/401 |
| 5,359,522 A | * | 10/1994 | Ryan | 235/382 |
| 5,459,304 A | | 10/1995 | Eisenmann | 235/380 |
| 5,520,275 A | * | 5/1996 | Foglino | 235/381 |
| 5,559,885 A | * | 9/1996 | Drexler et al. | 235/379 |
| 5,581,464 A | * | 12/1996 | Woll et al. | 364/424.04 |

FOREIGN PATENT DOCUMENTS

| | | | | |
|---|---|---|---|---|
| JP | 36328674 | * | 11/1988 | |
| JP | 403204795 | * | 9/1991 | 902/27 |
| JP | 406036100 | * | 2/1994 | 235/380 |
| WO | WO 8504035 | * | 9/1985 | 235/380 |

OTHER PUBLICATIONS

Dean et al., Smartcards in Transport, Web Search, Jul. 19, 1999.*

* cited by examiner

Primary Examiner—Michael G. Lee
Assistant Examiner—Daniel St. Cyr
(74) Attorney, Agent, or Firm—Whitham, Curtis & Christofferson, PC

(57) ABSTRACT

A computerized "smart card" which has a read/write memory and formatted data storage blocks is used to track the life history of one or more associated machine(s) (e.g., vehicles, medical instrumentation and apparatus, business and copying machines, etc.). The smart card can store a variety of information including machine identification, hardware/software specifications, debit/credit, regulated performance, warranty/insurance, maintenance/service and operational transactions that might impact the hardware, software or the intended operation or performance of the machine. The smart card will be equipped to interact with any of a plurality of autonomous reader/writer smart card units and computer-based reader/writer smart card units that may be equipped to interact with any of the plurality of computer databases through the utilization of land or wireless communications links. Preferably, each smart card will be associated with one or more specific machines at the time of sale of the machines, and will be periodically updated at each transaction (e.g., repair, scheduled maintenance, transfer of title, etc.) using reader/writer units operated by service technicians, repair shops, insurance agents, or the like. Thus, upon transfer of title of the machine, the smart card will also be transferred to provide the new owner with a complete life history for the machine. The stored life history can be used for valuation, maintenance scheduling, problem trouble shooting, and other applications. In the case of a single card being associated with a group of machines (e.g., a company with a fleet of cars, trucks or buses, or a company with several photocopiers, etc.), the card can also be used to track the scheduled replacement of individual machines within the group. Provisions are also made to associate new cards with existing machines to track the future life history of a particular machine.

6 Claims, 19 Drawing Sheets

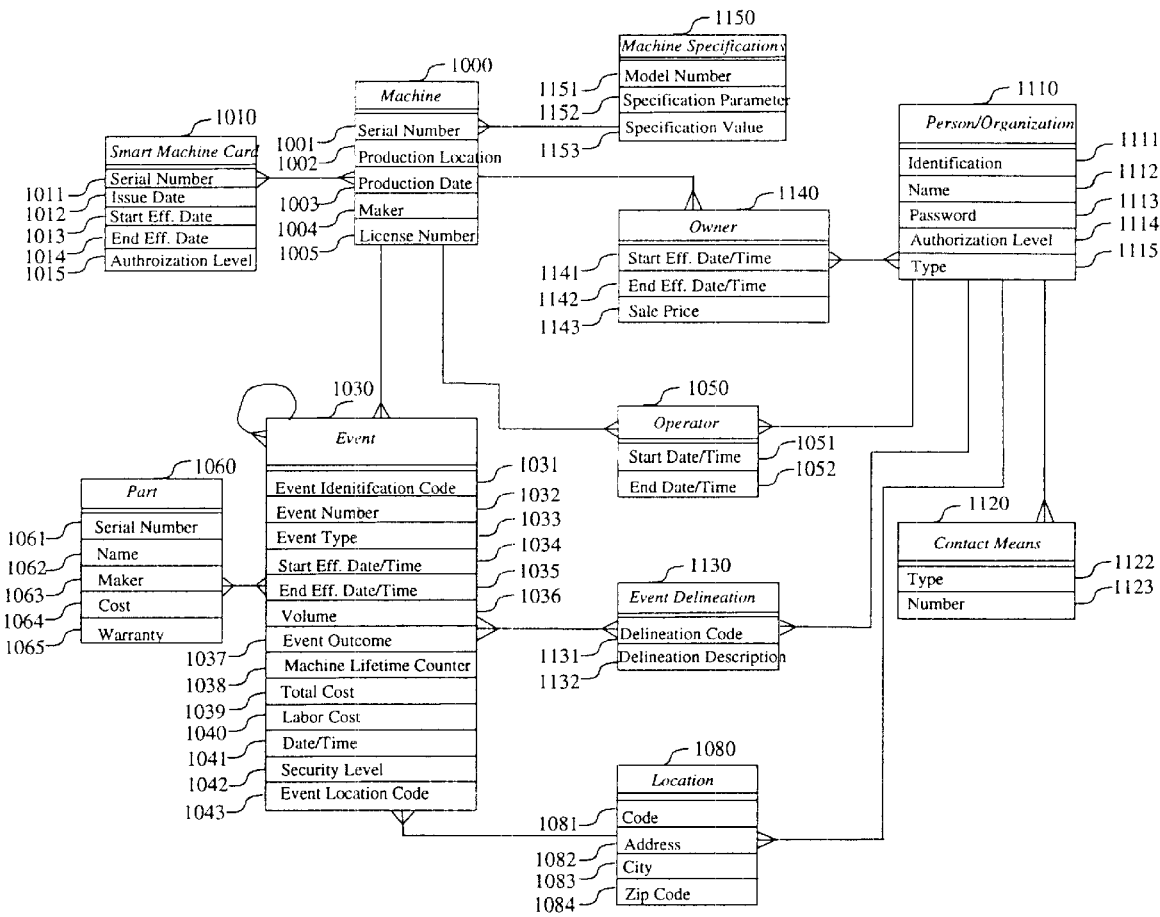
Figure 1: Entity Relationship Diagram
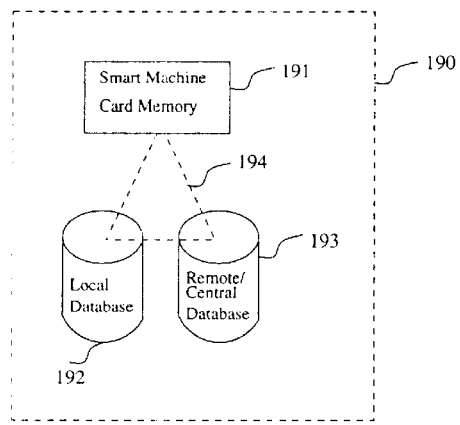
Figure 2: Storage of data on the smart machine card, local and remote/central databases

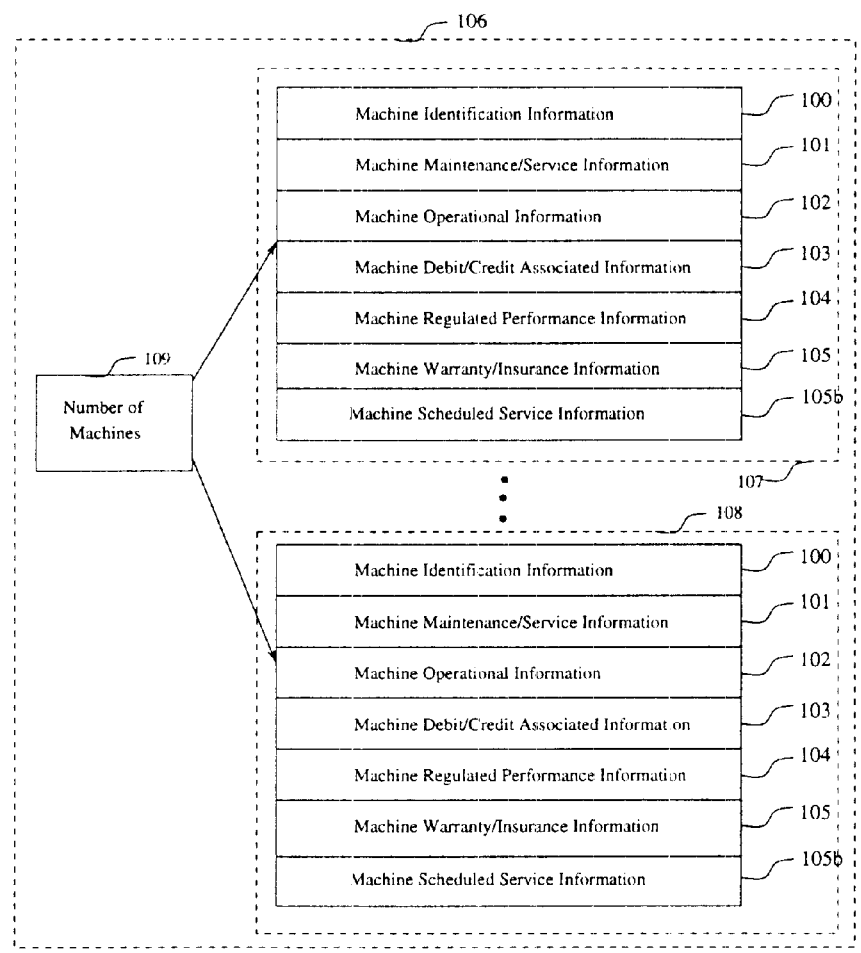
Figure 3: Top Level Data Structure for Multiple Machines on a Smart Machine Card

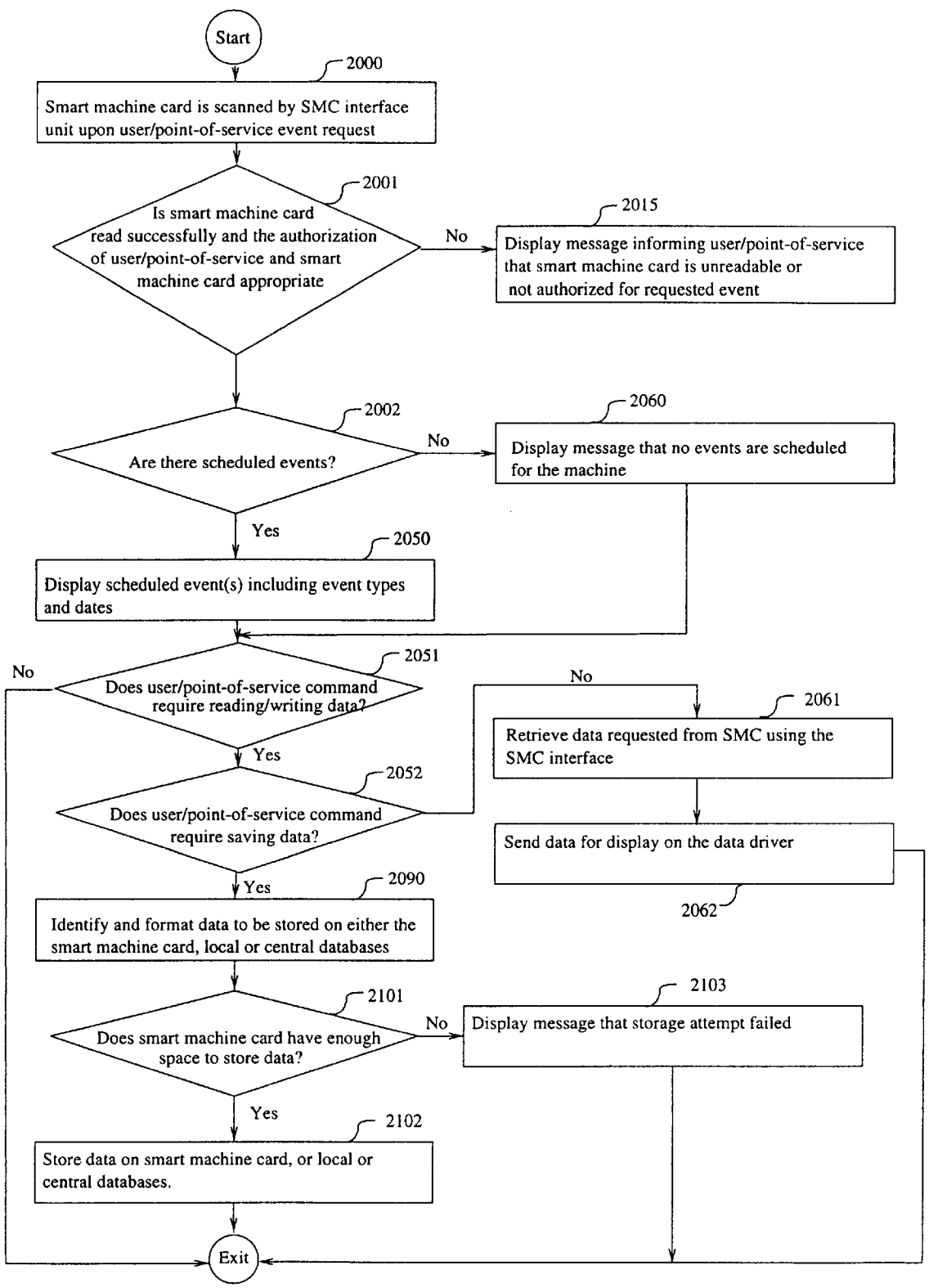
Figure 5: High Level Software Flow Chart

| | |
|---|---|
| Makers Identification Code | ← 200 |
| Date of Production | ← 201 |
| Location of Production | ← 202 |
| Model Code | ← 203 |
| Seriel Number | ← 204 |
| Smart Machine Card Servicing Code | ← 205 |
| Machine's Operator Identification Information | ← 206 |
|     Primary Owner Name | ← 207 |
|     Primary Owner Identification Number | ← 208 |
|     Primary Owner Password | ← 209 |
|     Date of Purchase | ← 210 |
|     Number of Secondary Operators | ← 211 |
|     Secondary Operators Names | ← 212 |
|     Secondary Operators Identification Numbers | ← 213 |
|     Secondary Operators Passwords | ← 214 |
| Machine's Former Owner's Number | ← 215 |
|     Former Owners Names | ← 216 |
|     Former Owners Identification Numbers | ← 217 |
|     Former Owners Date of Purchase | ← 218 |
| Machine's Authorization | ← 219 |
| Location of Sale | ← 220 |

Figure 6: Machine Identification Information

| | |
|---|---|
| Number of Scheduled Service Transactions | ← 230 |
|     Service Transaction Code | ← 231 |
|     Service Transaction Date | ← 232 |
|     Time Code in the Machine Life-Time | ← 233 |
|     Service Recommender Identification Code | ← 234 |
|     Scheduled Service Identification Number | ← 235 |

Figure 7a: Machine Scheduled Service Information

| | |
|---|---|
| Service Provider Identifier Number | ← 250 |
| Date of Service | ← 251 |
| Provider's Authorization Code | ← 262 |
| Service Report Information | ← 252 |
|     Component Serial Number | ← 253 |
|     Component Maker Code | ← 254 |
|     Service Code | ← 255 |
|     Cost of Component | ← 256 |
|     Warranty Code on Component/Labor | ← 257 |
|     Labor Cost | ← 258 |
|     Miscellaneous Cost | ← 259 |
|     Cause of Failure Code | ← 260 |
|     Time Code in the Machine Life-Time | ← 261 |
| Actual Service Provider's Number | ← 263 |

Figure 7: Machine Maintenance Information

| | |
|---|---|
| Operational Transactions Number | ← 300 |
|     Transaction Code | ← 301 |
|     Transaction Date | ← 302 |
|     Transaction Cost | ← 303 |
|     Transaction Provider Identification Code | ← 304 |
|     Transaction Amount | ← 305 |

Figure 8: Machine Operations Information

| | |
|---|---|
| Debit/Credit Grantor Identification Code | 350 / 351 |
| Debit/Credit Issue Date | 352 |
| Debit/Credit Expiration Date | 353 |
| Debit/Credit Limitation Codes | 354 |
| Debit/Credit Exclusion Codes | 355 |
| Debit/Credit Amount Left on Machine's Account Balance | 356 |
| Debit/Credit Password | 357 |
| Debit/Credit Transactions Records | 358 |
|     Debit/Credit Transaction Code | 359 |
|     Date/time of Transaction | 360 |
|     Provider Identification Code | 361 |
|     Debit/Credit Transaction Amount | 362 |
|     Service Code | 363 |
| Debit/Credit Type Code | |

Figure 9: Machine Debit/Credit Associated Information

| | |
|---|---|
| Regulator's Identification Code | 400 / 401 |
| Machine's Identifier in Regulatory Records | 402 |
| Regulatory Article Numbers that Apply to the Machine | 403 |
| Regulatory Compliance Records | 404 |
|     Regulatory Code | 405 |
|     Compliance Amount | 406 |
|     Date/Time of Detection | 407 |
|     Date/Time of Compliance | 408 |
|     Examiner's Identification Code | |

Figure 10: Machine Regulated Performance Information

| | |
|---|---|
| Warranty/Insurance Grantor Identification Code | 450 / 451 |
| Warranty/Insurance Starting Date | 452 |
| Warranty/Insurance Expiration Date | 453 |
| Warranty/Insurance Limitation Codes | 454 |
| Warranty/Insurance Exclusion Codes | 455 |
| Warranty/Insurance Service Records | 456 |
|     Warranty/Insurance Service Code | 457 |
|     Date of Service | 458 |
|     Provider Identification Code | |

Figure 11: Machine Warranty/Insurance Information

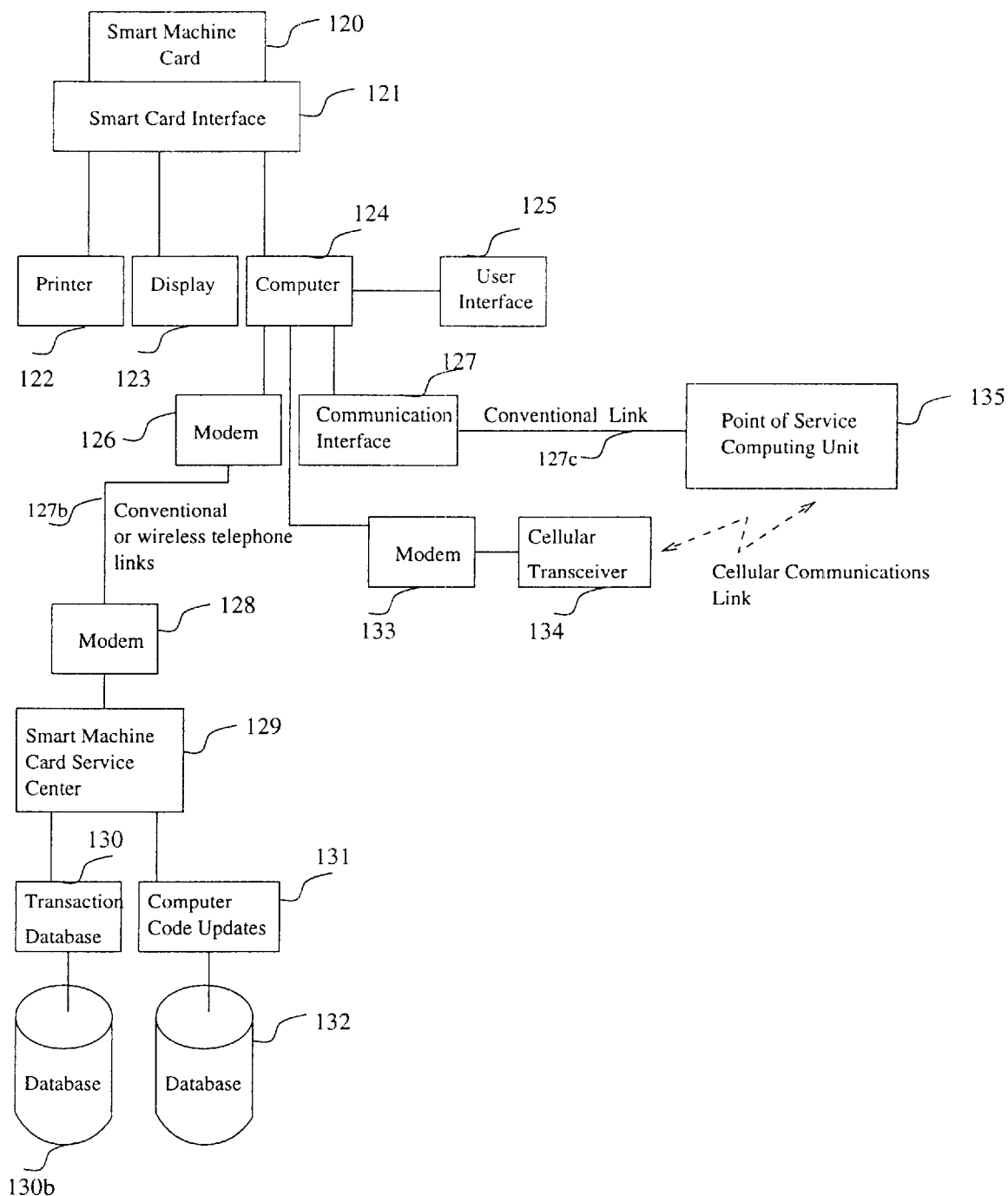
Figure 12: Smart Machine Card System Architecture

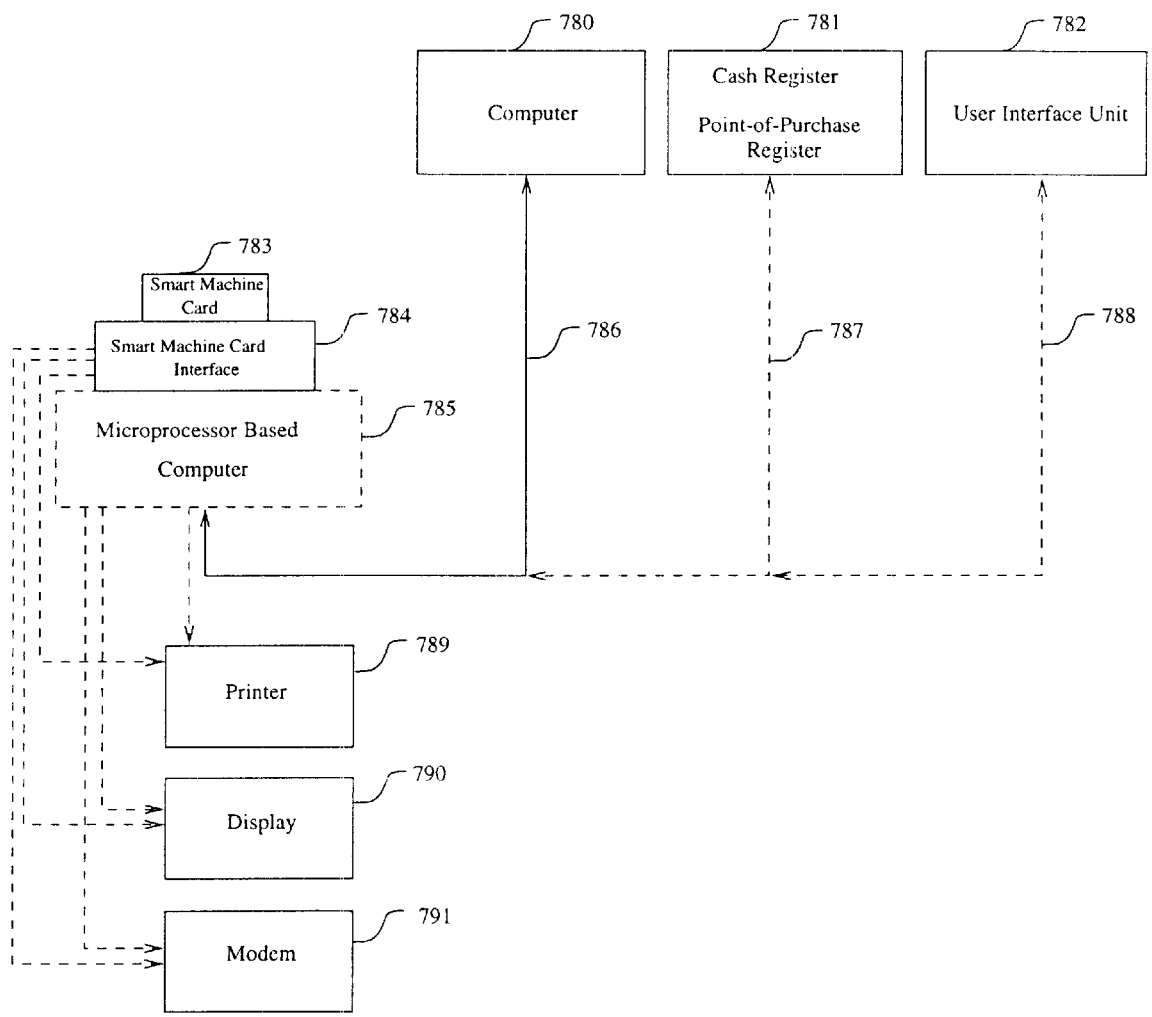
Figure 13: Smart Machine Card Point of Service Architecture

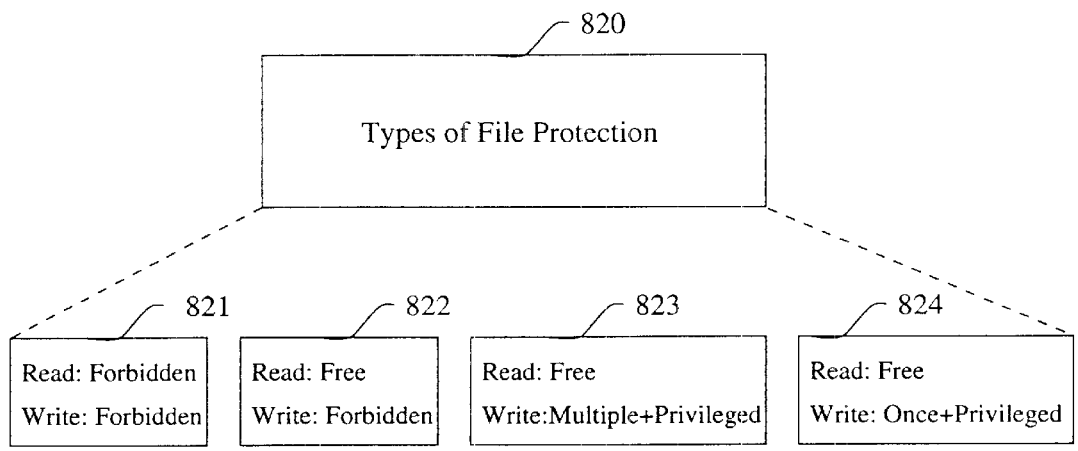
Figure 14: Protection Types for Files on Smart Machine Card
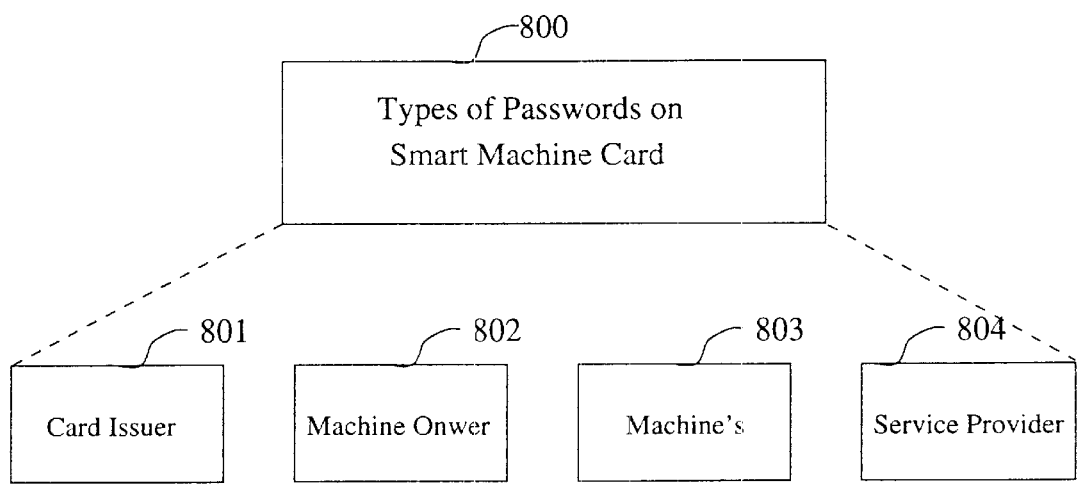
Figure 15: Password Types for Files on Smart Machine Card

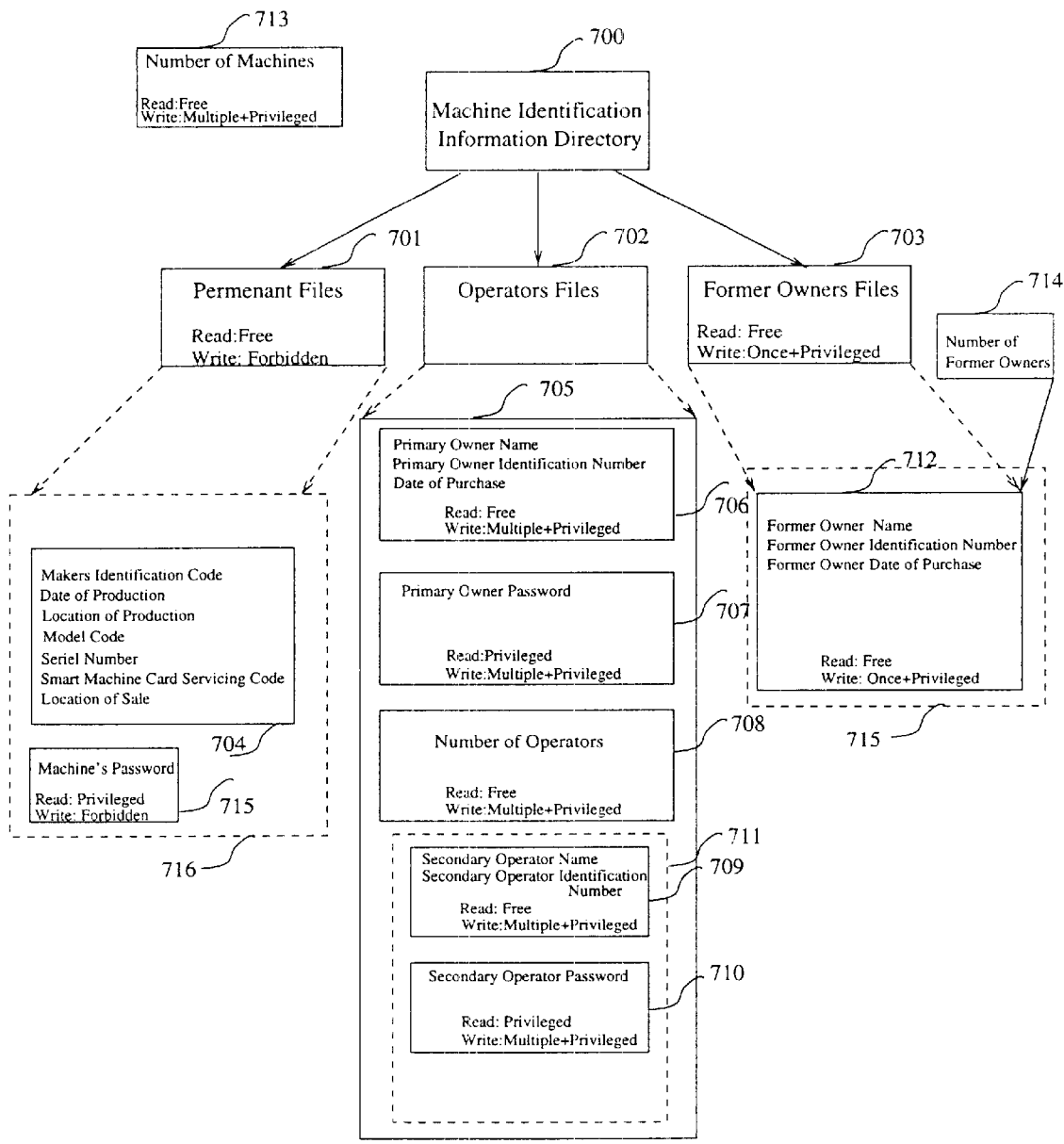
Figure 16: Machine Identification Information File Layout

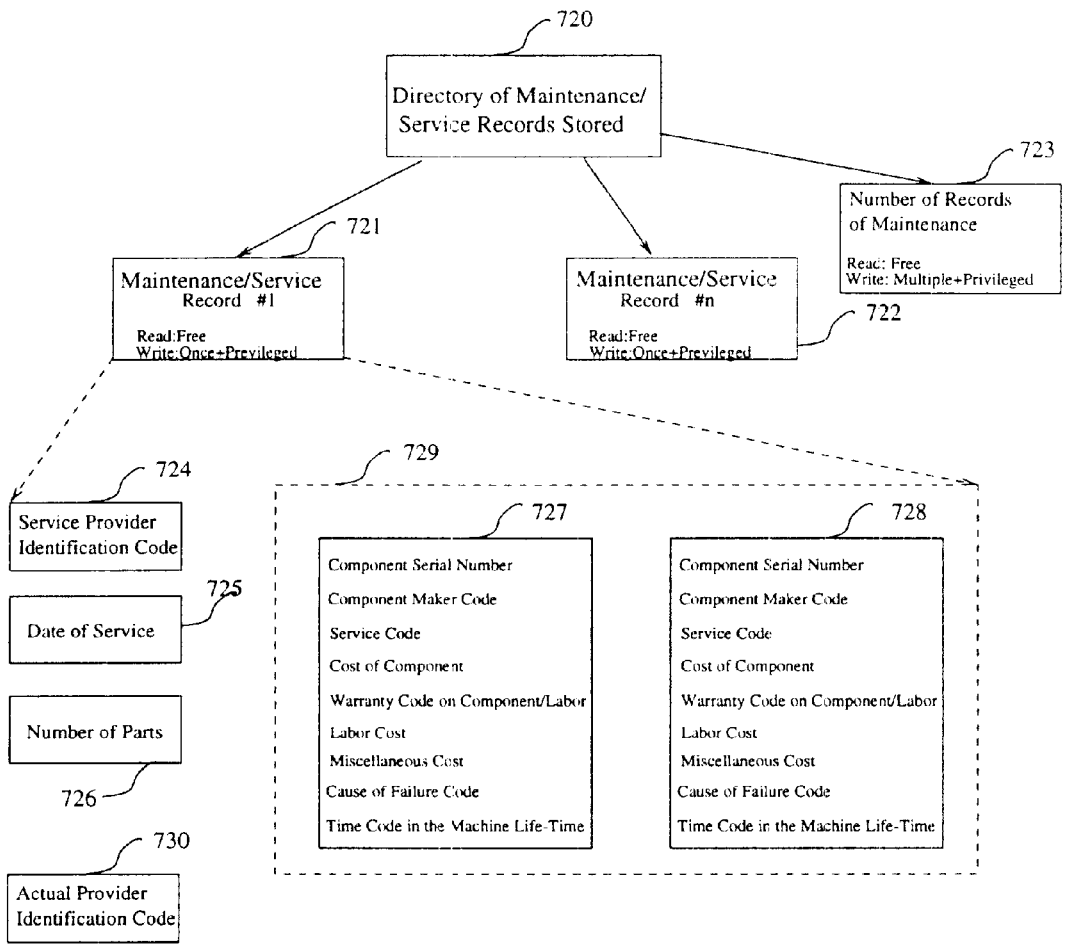
Figure 17: Machine Maintenance Information File Layout
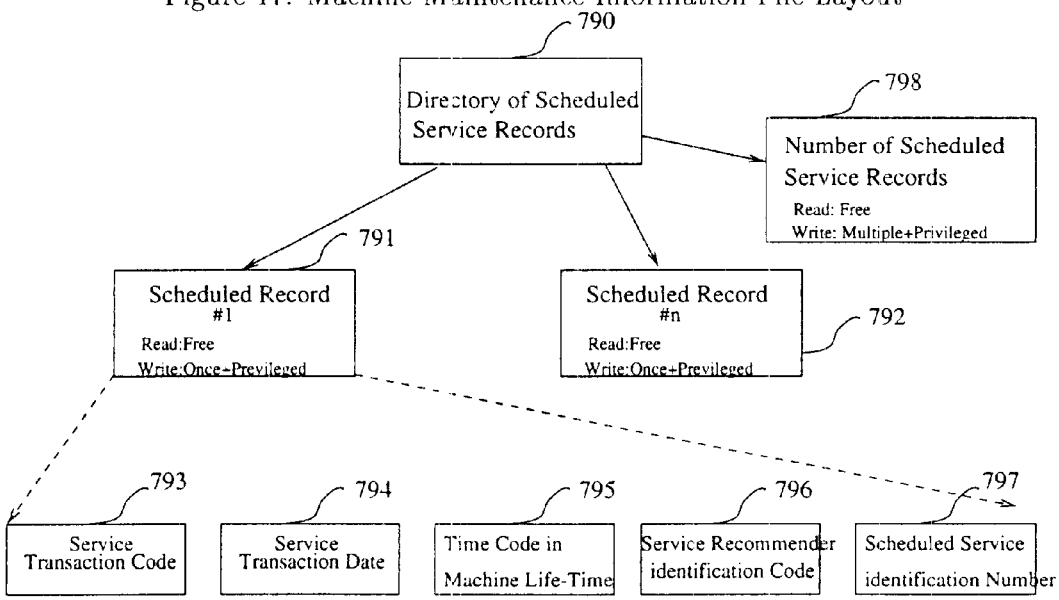
Figure 17a. Machine Scheduled Service Information File Layout

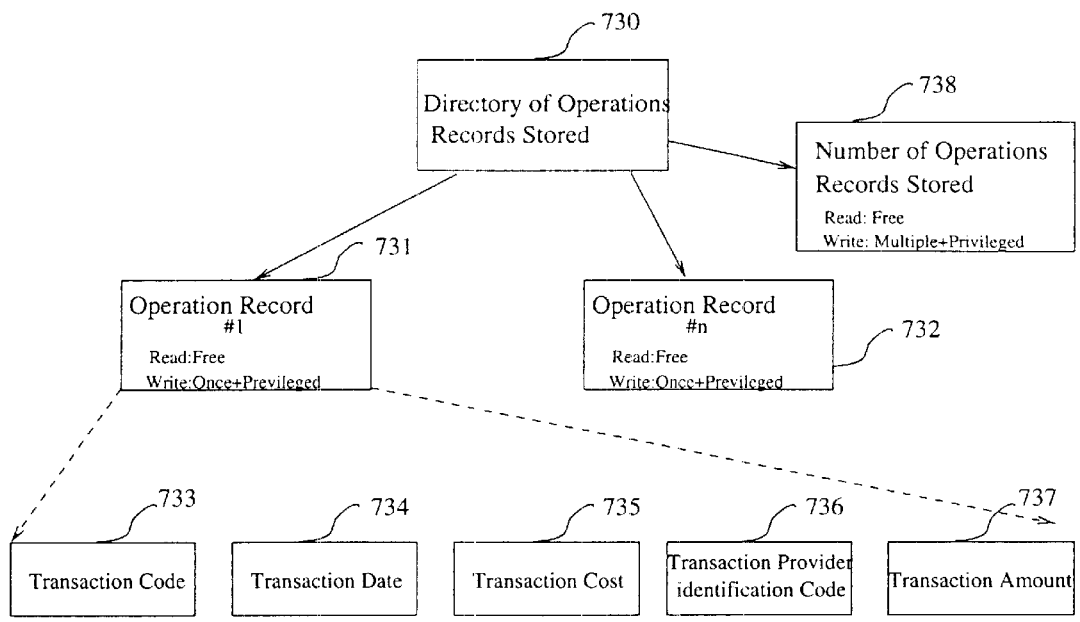
Figure 18: Machine Operations Information File Layout
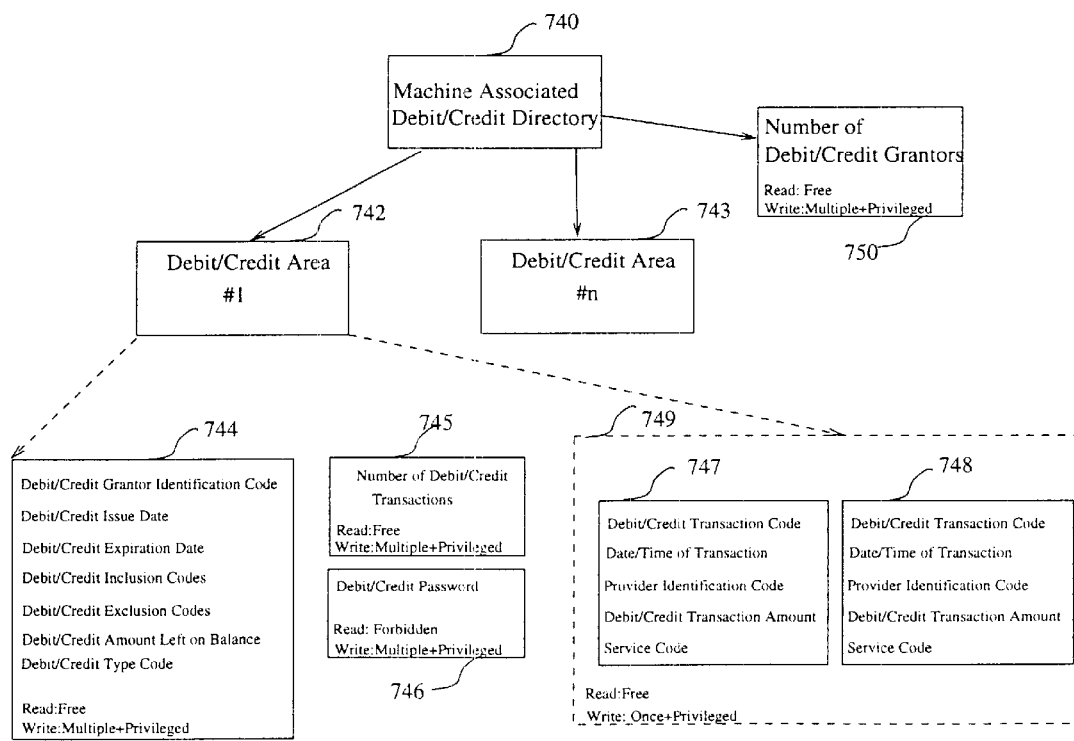
Figure 19: Machine Associated Debit/Credit Information File Layout

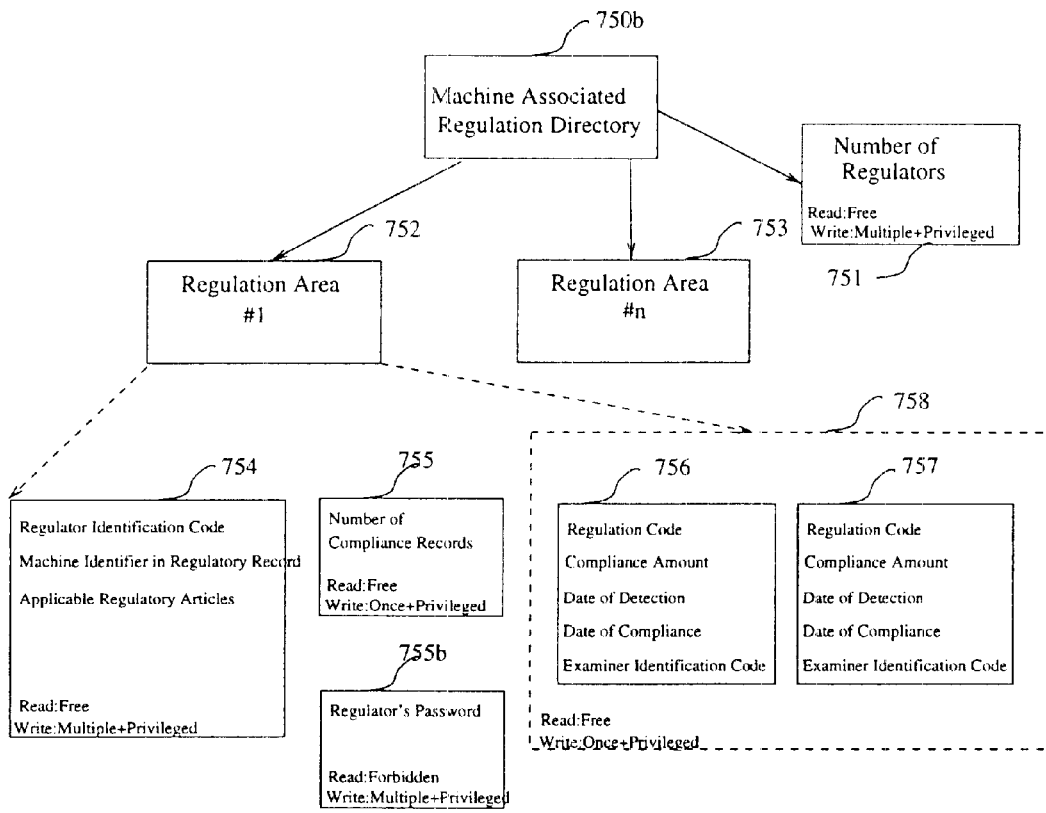
Figure 20: Machine Regulated Performance Information File Layout
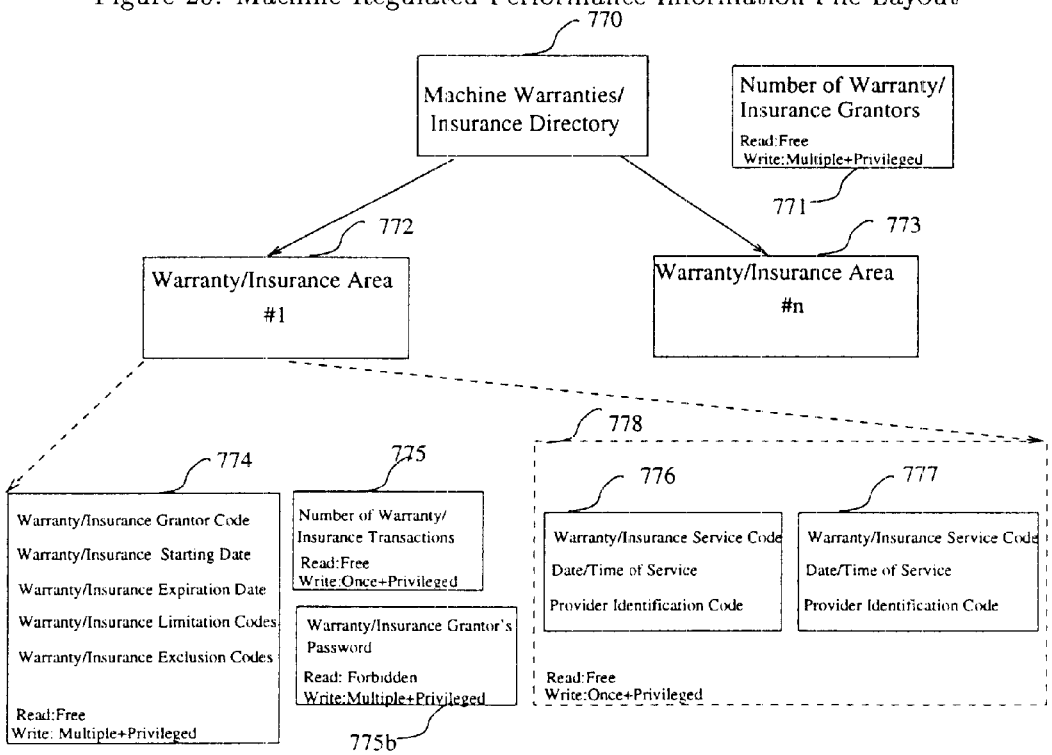
Figure 21: Machine Warranty/Insurance Information File Layout

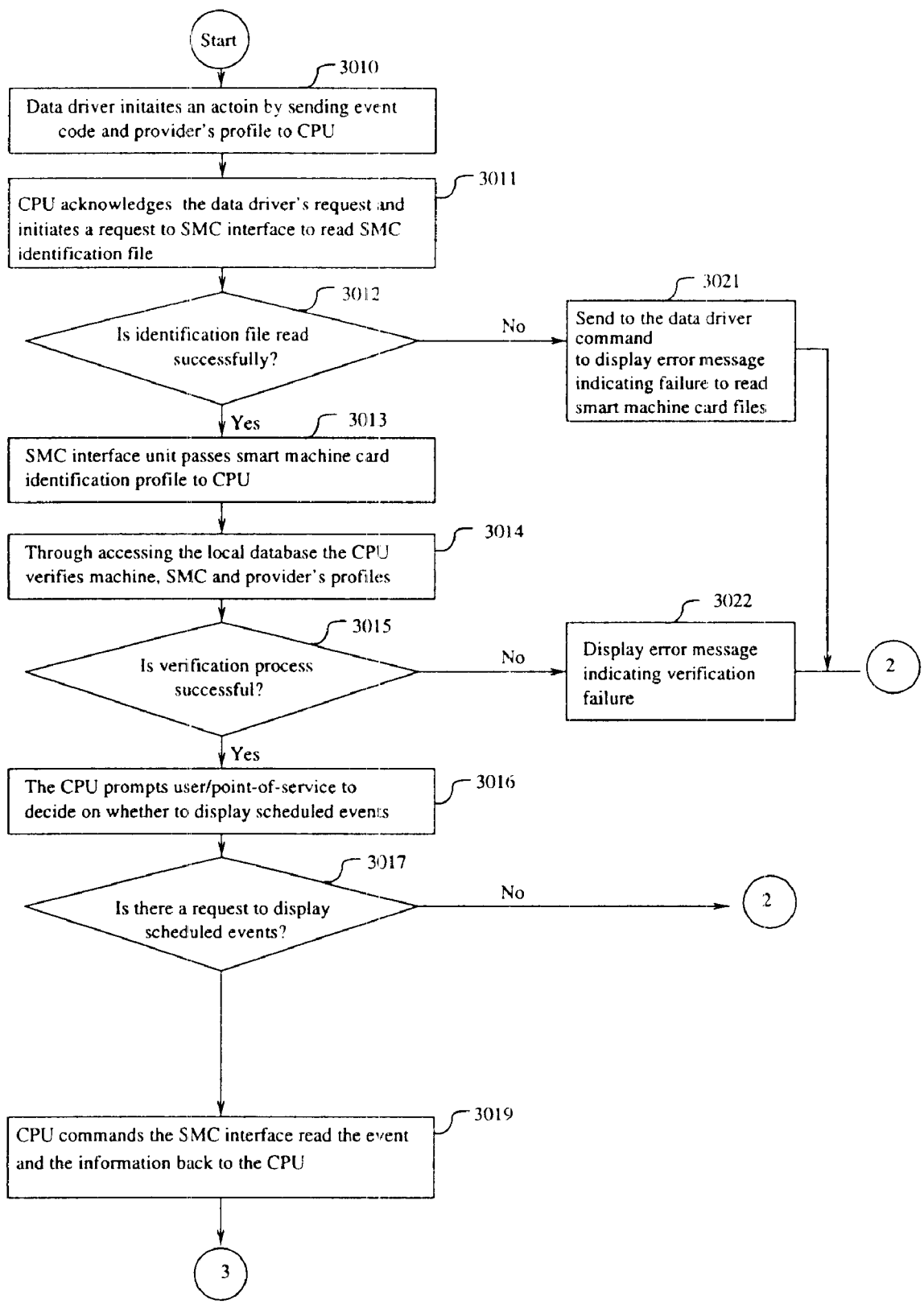
Figure 22: Software Flow Chart 1

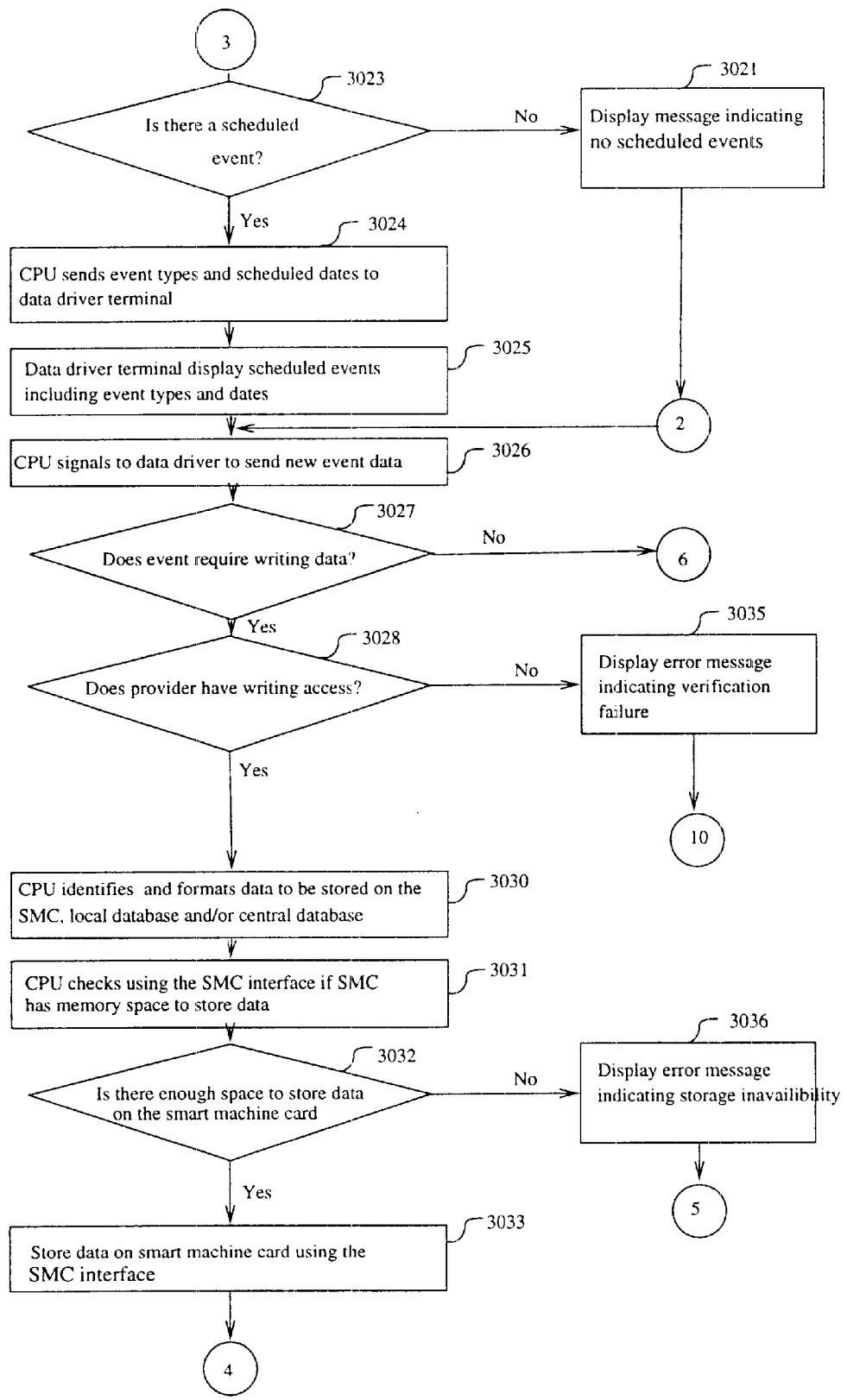
Figure 23: Software Flow Chart 2

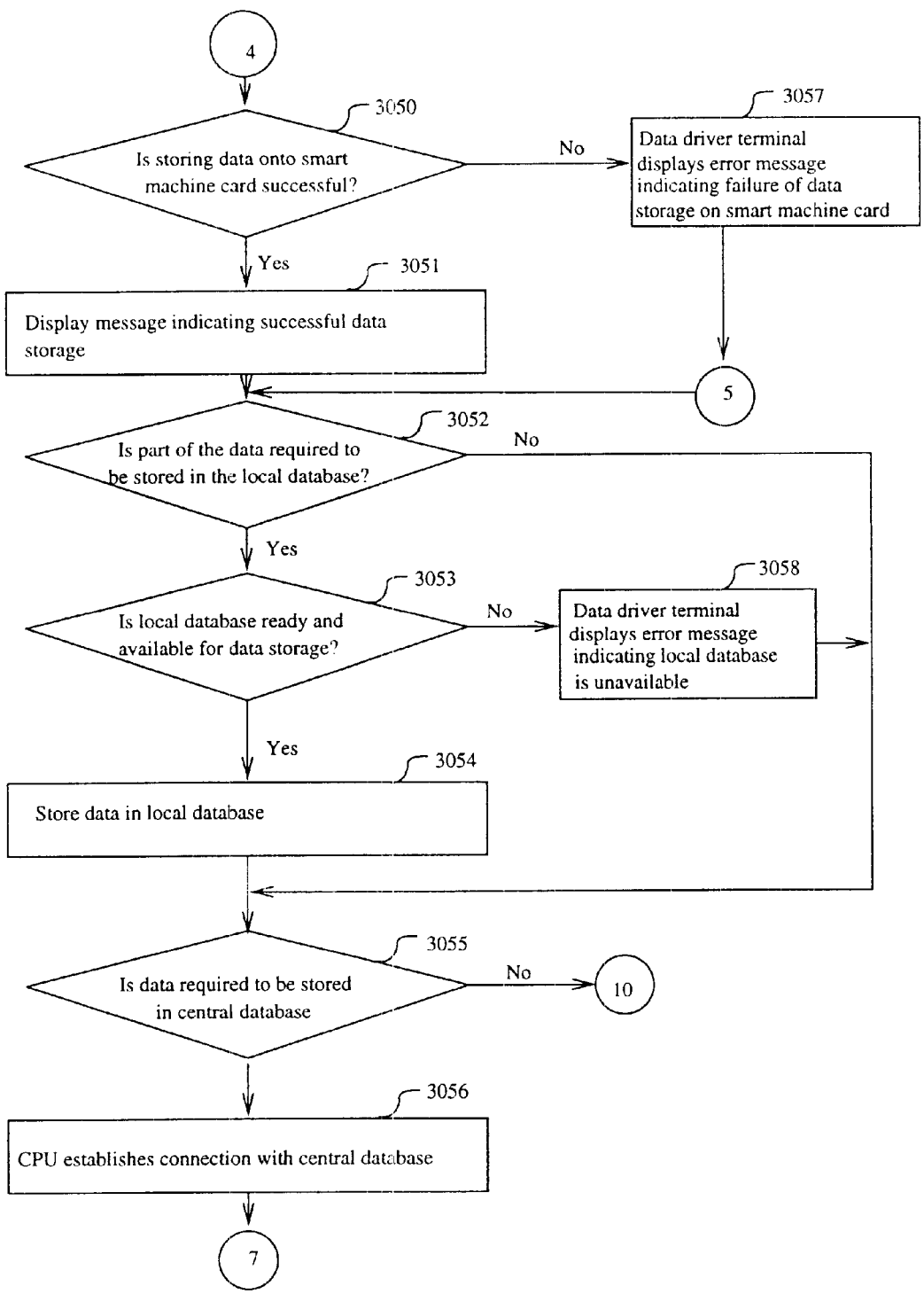
Figure 24: Software Flow Chart 3

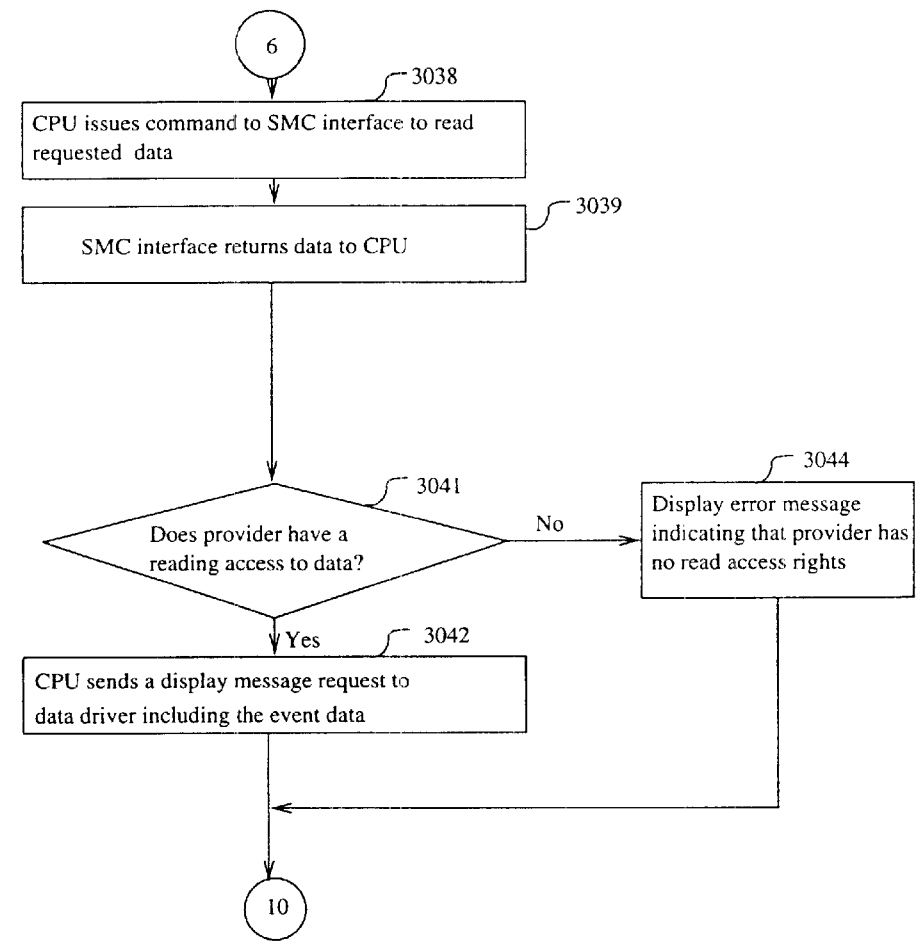
Figure 25: Software Flow Chart 4
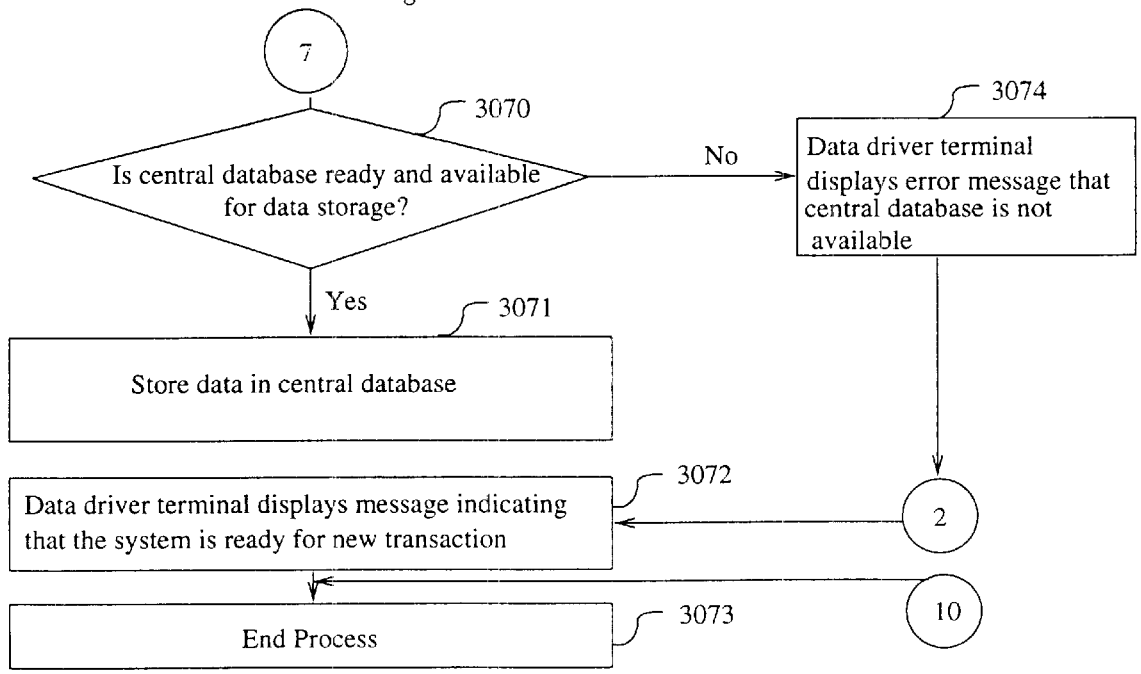
Figure 26: Software Flow Chart 5

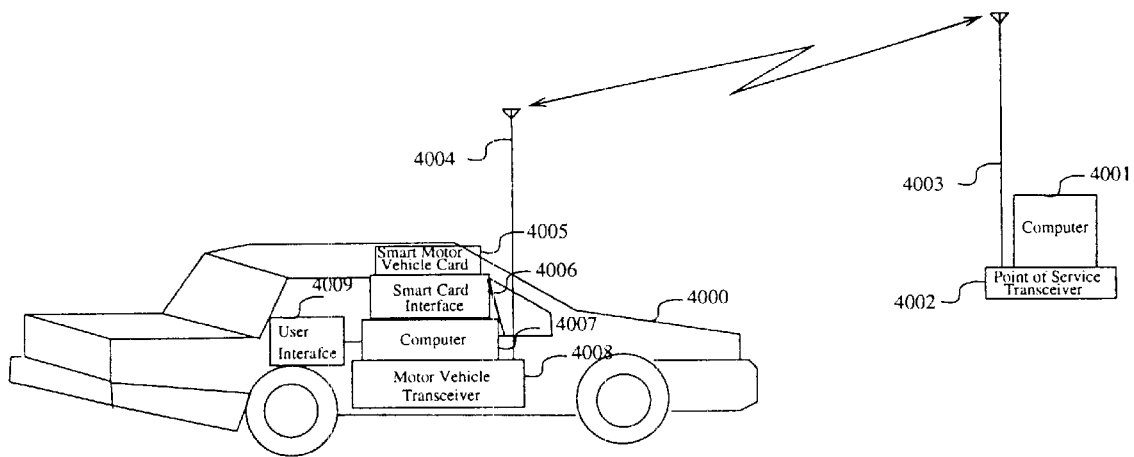
Figure 27: Smart Motor vehicle Operation Environment
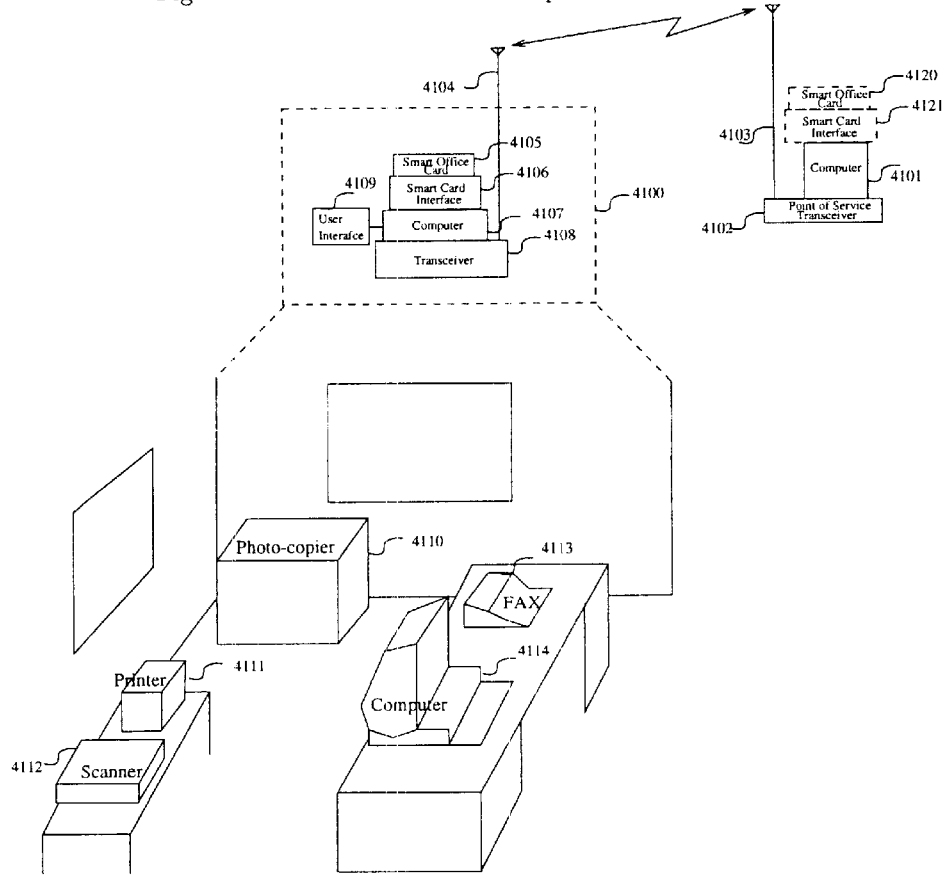
Figure 28: Smart Office Card Operation Environment

SMART CARD FOR RECORDING IDENTIFICATION, AND OPERATIONAL, SERVICE AND MAINTENANCE TRANSACTIONS

BACKGROUND OF THE INVENTION

1. Field of the Invention

The invention relates generally to computerized cards often referred to as "smart cards" that include readable/writable memory and, more particularly, to a smart card and data handling techniques for recording and retrieving the identification, specifications, debit/credit, warranty/insurance, regulation, maintenance/service, and operations that may impact the value, structure, operation specifications or performance of a machine during its life-time.

2. Description of the Prior Art

Credit/debit cards, automated teller machine (ATM) cards, and security identification (ID) cards are well known and in common use today. These cards typically have a magnetic strip containing user identification information that identifies the holder of the card. Upon being read by a conventional reader, the holder of the card is allowed access to credit, his/her funds at a bank, or a secure portion of the building, depending on the nature of the card. Smart cards differ from these other types of cards in that they can be updated to store new information or to change information that is no longer correct. Thus, smart cards would typically be used in applications where more than storage of user information is required.

U.S. Pat. No. 5,459,304 to Eisenmann discloses a smart card and smart card techniques for motor vehicle record administration. In Eisenmann, a smart card stores and updates a variety of different types of information that is unique to a particular motor vehicle operator. For example, the card, in addition to storing identification information such as driver's license registration and motor vehicle registration, is designed to store and update information such as dates of environmental inspection for the car, number and time of traffic tickets, automobile insurance, highway toll account balance, and parking garage entry, exit, and account balances. The Eisenmann invention is specifically designed for managing and simplifying a particular individual's records pertaining to his or her use of an automobile.

During the life-time of a machine from production to disposal it is subject to numerous transactions or events that can alter the operational specifications for which it was designed. Depending on the machine, currently, such information is maintained in a distributed form on paper records or disjointed electronic databases that are maintained by the makers, owners, operators or servicing agents of the machine. These records are often subject to physical or electronic loss and always require "purposive" or "positive" actions on the part of the makers, owners, operators or servicing agents to record each transaction involving the machine. These records are also scarcely integrated in the machine or its immediate operating environment. Due to the fact that different types of information may be recorded by different servicing agents, these records are often incomplete, incompatible and subject to variations that complicate the record keeping and information retrieval of transactions involving the machine. Retrieving these records involves searches in multiple databases or files that are designed to serve the provider of the service rather than the machine itself or its owner/operator. It also, occasionally, involves dependence on parties that have a vested interest in determining or affecting the use or servicing necessary of the machine (e.g., the suppliers and service agents of the machine may have their own records on machines to assist them in tracking records, suggesting servicing operations etc.).

To achieve the purpose of better use of machinery and to serve the interest of the owner, operator, service provider or manufacturer of such machinery, it is be desirable to have an independent system which fully contains all information that may impact the maintenance and operation of the machine during its life-time. Such a system should desirably be effortless to the owner(s), servicing agent(s), and point(s) of interaction of this machine with human operated or automated systems. Furthermore, this system should desirably be able to notify the owner of necessary maintenance/service operations which may affect its designed performance, warranty/insurance etc. Most conveniently, such a system should be integrated into the machine (where feasible) or be of small physical size requiring no effort to carry on the part of the owner/operator. Furthermore, it is desirable for such system to serve the best interest of the owner/operator of the machine by having immediate and concise access to information without the dependence on other parties such as service providers that may have vested interest in the choices of handling aspects of machine operation. It may also be appreciated that a well maintained record of a machine can significantly improve its operation during its life-time and can lead to financial and material savings, value preservation, in addition to maintaining performance close to its designed specifications.

SUMMARY OF THE INVENTION

It is an object of this invention to provide a smart card for storage and retrieval of information pertaining to the identification and life history of a particular machine or machines associated with the smart card, wherein the smart card can be updated with each event or transaction.

According to the invention, a computer readable/writable smart card is used for the book-keeping of maintenance, service and operational records of a machine during its life time. Preferably, a smart machine card (SMC) is associated with one or more machines at the time of purchase/production and is initialized with relevant identification and servicing information so that the complete life history of the specific associated machine can be tracked; however, a new smart card can be associated with an existing machine after purchase/production for tracking all future events in the life of the particular associated machine by providing the smart card with identification and servicing information. The smart machine card is equivalent to the machine owner/operator's summary of significant events in the life-time of a machine. Maintenance services and operations that are deemed to have the potential to alter the performance specifications of the machine or benefit the machine or its operators are recorded on the smart machine card. The smart machine card can also hold a debit/credit value associated with the machine, information about relevant regulated performance, warranty/insurance information, and a variety of other information. The smart machine card is used in conjunction with a smart machine card reader/writer using physical or wireless communication protocol to record information pertinent to transactions. The smart machine card may also interface to a computer-based reader/writer that produce an electronic or printed output representing the plurality of the contents of the card and information deemed to affect the intended performance of the machine.

BRIEF DESCRIPTION OF THE DRAWINGS

The foregoing and other objects, aspects and advantages will be better understood from the following detailed description of the preferred embodiments of the invention with reference to the drawings, in which:

FIG. 1 is a high level entity relationship diagram;

FIG. 2 is a schematic diagram showing the storage of data on the smart machine card, local and remote/central databases;

FIG. 3 is a top level data structure for multiple machines on a smart machine card;

FIG. 5 is a high level software flowchart;

FIGS. 6, 7, 7a, 8, 9, 10 and 11 are datablock diagrams showing machine identification information, machine maintenance information, machine operations, information, machine debit/credit associated information, machine regulated performance information, and machine warranty/insurance information;

FIG. 12 is a schematic diagram showing the smart card system architecture;

FIG. 13 is a schematic diagram showing smart card point-of-service architecture;

FIG. 14 is a schematic diagram showing protection types for files on the smart card;

FIG. 15 is a schematic diagram showing password types for files on the smart card;

FIGS. 16, 17, 17a, 18, 19, 20, and 21 show the details of various file layouts on the smart machine card;

FIGS. 22–26 show software flow diagrams used in the operation of the smart machine cards;

FIG. 27 is a schematic diagram showing a smart motor vehicle operation environment for the smart card; and FIG. 28 is a schematic diagram showing a smart office card operation environment for the smart card.

DETAILED DESCRIPTION OF THE PREFERRED EMBODIMENTS OF THE INVENTION

Figure 4:
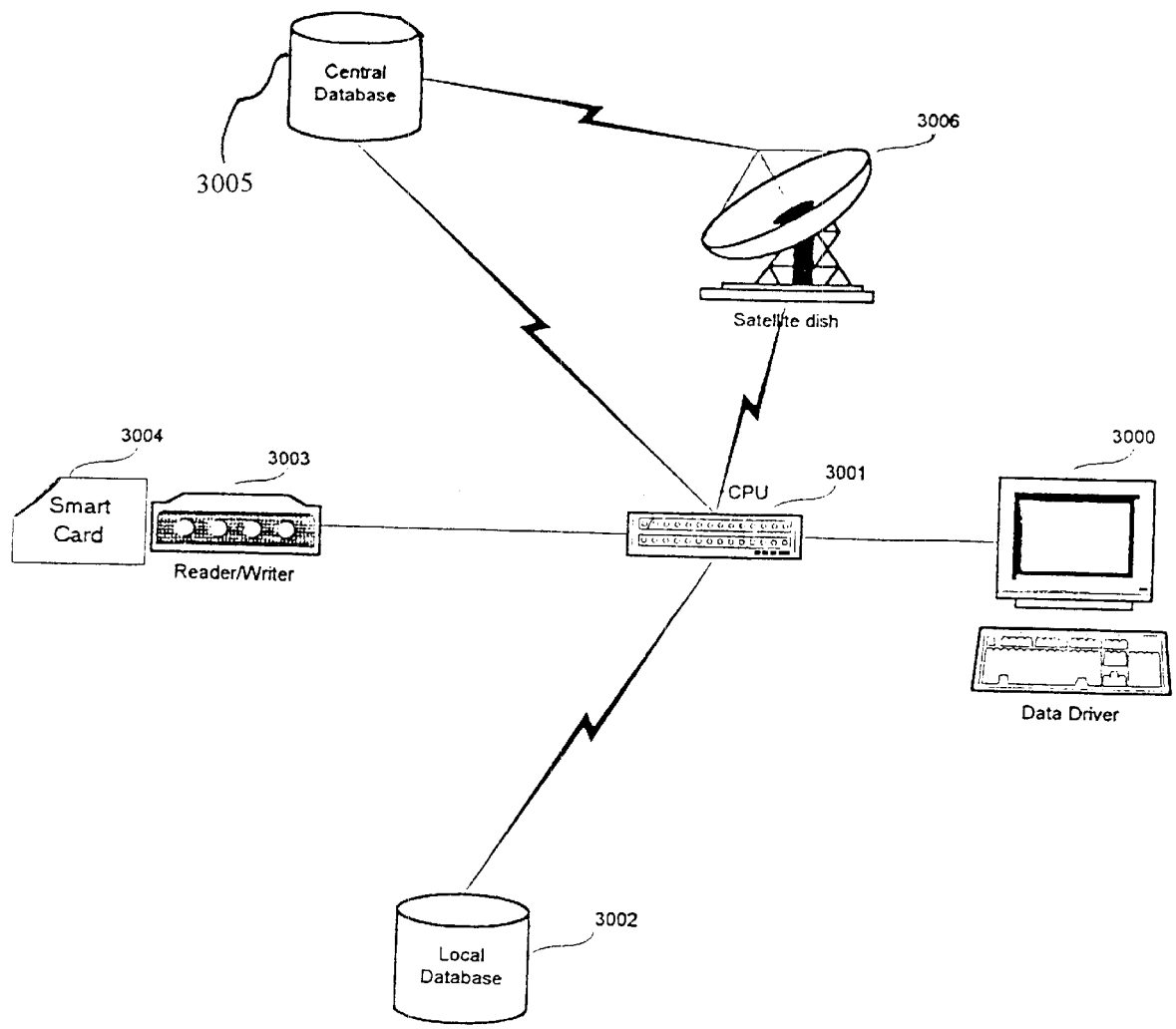
FIG. 4 is a schematic diagram showing the four major components of the smart card environment.

Smart Card in Relation to High Level System

In this section the logical representation of information related to the operation of the smart machine card is described.

The Entity Relationship Diagram (ERD) in FIG. 1 describes the data interactions of the smart machine card. A special notation is employed in this diagram. Boxes in the ERD represent entities/objects of importance to the implementation of the smart machine card environment. The properties of those objects are called attributes and are represented inside each box. The lines connecting the boxes represent relationships between those objects. The relationships are of three types: one-to-one, one-to-many, and many-to-many. A one-to-one relationship is represented by a straight line. The "many" side of the relationship is represented by a fork shape at the end of the line connecting the objects. The name of the relationship changes depending on the direction from which the relationship is read. Therefore for each line there should be two descriptions representing the nature of the relationship as perceived from the entity that it is read from. FIG. 1 provides a high level logical description of the data elements that will be required to store, retrieve, and process the smart machine card information. In the following section more detailed diagrams will be used to illustrate what, where and how the different data elements will be stored, retrieved, and processed.

With reference to FIG. 1, machine 1000 includes information that describes it and identifies its relationship to other objects/entities. The following attributes are used to identify and process information about a machine: the serial number 1001 is a unique identifier usually provided by the manufacturer; the production location 1002 is the location code at which the machine was manufactured; the production date 1003 is the date on which the machine was manufactured; the maker 1004 identifies the manufacturer of the machine; and the license number 1005 is assigned by a licensing authority to identify the machine.

The machine specifications 1150 detail the specifications of the machine such as hardware, software, operation specifications, etc. The model 1151 describes the design model of a machine, uniquely determined by the manufacturer. The specification parameter code 1152 identifies a specification parameter (i.e., variable) and the specification value 1153 holds the specific value associated with this specification parameter 1152. The relationship between the machine 1000 and its operators 1150 indicates that multiple specificities can be used to describe a machine.

One or more smart machine cards 1010 can be used to store basic information about one or more machines 1000, hence the many-to-many relationship between these two entities. The following attributes uniquely identify a smart machine card. The serial number 1011 is a unique identifier of the smart machine card determined by the issuer of the card. The issue date/time 1012 is the date/time the smart machine card 1010 was issued to the machine. The starting date/time 1013 of effective use of the card and the ending date/time 1014 of effective use of the card indicate the active life-time of the smart machine card. The authorization level of the smart machine card 1015 indicates the types of authorizations given to the specific smart machine card. The authorization levels determine the services that the smart machine card has been given by the issuer of the smart machine card.

A machine 1000 can be owned by one or more owners 1140 at the same time or at different time intervals. The following attributes are used in registering ownership. Start effective date/time 1141 is the effective date/time marking the start of the machine ownership. End effective date/time 1142 is the effective data-time marking the end of the machine ownership. The sale price 1143 is the price paid for the machine by the owner.

The owner entity 1140 has a relationship to the individual/organization entity 1110 which contains the actual information about the individual/organization that owns the machine. Using this relationship it is possible to recover information about the owner. The attributes of the individual/organization entity 1110 include the: individual identification code 1111 which is a unique identifier of an individual/organization, name 1112 of the individual/organization, password 1113 that the individual/organization can use to access the smart machine card, authorization level 1114 that indicates access rights of the individual/organization, and type 1115 of the individual/organization used to distinguish between individuals and organizations where organizations can be of types such as government, profit, non-profit, educational etc.

An individual/organization 1110 could have multiple means of contact 1120. The contact means type 1122 of communication may include fax, cellular, home, business phone numbers, electronic mail, etc. The number 1123 is the communication phone number, geographic or electronic address.

A machine 1000 could be operated by one or more operators 1050. The operator 1050 has a relationship with the individual/organization 1110. Through this relationship it is possible to retrieve information about the operator of the machine. Possible attributes of the operator entity are the start date/time 1051 at which the operator started to operate the machine and the end date/time 1052 at which the operator ended the operation of the machine.

A machine 1000 can be involved in one or multiple events as indicated by 1030. Examples of events include maintenance/service, operational, debit/credit, warranty/insurance transactions or regulation compliance. To simplify the high level representation we employ one entity to represent such transactions. Some of the attributes may not be required for some events as will become clear in the detailed description of this invention. The following attributes can be used to describe an event. Event identification code 1031 is a unique identifier of an event that is generated by the smart machine card server for internal tracking of events. Event number 1032 is a unique identifier of an event that is generated by the provider (creator) of an event. Event type 1033 identifies the type of an event. This attribute is required to identify and group events such as maintenance/service, operational, debit/credit, regulatory and insurance/warranty events. Start effective date/time 1034 is the date/time at which an event becomes effective. End effective date/time 1035 is the date and time when an event ends. Event volume 1036 records information on events that require registering specific volumetrics. For example, an operational event requires the usage of certain energy e.g., gasoline, in such an event the volume records the amount of gasoline acquired to operate the machine. Event outcome 1037 describes the outcome of an event such as success or failure. Machine life-time counter 1038 is a number that represents a landmark in the life-time of the machine. Total cost 1039 is the amount incurred to perform the event. Labor cost 1040 is the cost of the event's labor. Date/time 1041 indicates the date/time at which the event occurred. Security level 1042 indicates a security level assigned to the event by the smart machine card environment. Event location 1043 provides a code identifying where the event has taken place. An event may be related to another event, hence the recursive relationship. For example, a maintenance event can be linked to a follow up event and can be used as a reminder event.

Events such as 1030 may involve parts such as 1060 in the transaction. Parts are hardware, material or software objects that could be removed, modified or replaced to maintain, enhance or operate the machine. The following are attributes of the part 1060 entity: the serial number which is a unique identifier of a part, the name 1062 of a part, the name of the manufacturer 1063, the cost 1064 of the part, and the warranty on the part 1065. Events such as regulation compliance or warranty/insurance require recording, retrieving, and processing information that is specific to the event; these are addressed in the event delineation 1130 entity. This entity describes, for example, information on the inclusion or exclusion of a warranty/insurance event, or in the case of a regulation event, this entity captures information on compliance with certain regulation acts. An event may have multiple event delineations 1130. An event delineation can be regulated or controlled by an individual/organization such as 1110. An individual/organization 1110 can control or regulate multiple event delineations.

The event delineation entity is described by the following attributes: event delineation code 1131, which is a code that uniquely identifies a delineation parameter (for example, a code that identifies a regulation act or a code that identifies an aspect of warranty/insurance); and the event delineation description 1132, which describes an aspect/value of the delineated code of the event. This attribute can acquire labels such as: inclusion that indicates that the current instance of delineation is of an inclusion type for an event such as warranty/insurance; exclusion delineation indicates that the current instance of delineation is of an exclusion type for an event such as warranty/insurance. The event delineation can also acquire qualitative values describing measurement or performance aspects of the event delineation code.

An event 1030 occurs at a location 1080. A location can be described by the following attributes: location code 1081, which is a unique identifier of a location; address 1082, which includes textual information describing the location; city 1083 in which the location resides, and zip code 1084.

FIG. 2 shows the storage of data on the smart machine card, local and remote/central databases. The information on the machine 190 is designed to be stored on the smart machine card with possible backup on either of local or central databases. The smart machine card memory 191 stores the complete record of transactions involving the card such as is shown in FIG. 3.

State-of-the-art in smart card technology allows storing 8 KBytes on a single smart card. This storage capacity is increasing at a fast rate and is expected to reach 32 KBytes in the near future (1–2 years). The information described in the preferred embodiment of this invention can be stored on a smart machine card. Coding and compression can be used to increase the storage efficiency and can be easily achieved by those skilled in the art.

Smart card reader/writers are widely available and are primarily used for monetary-related transactions or in high security applications. The proposed invention employs this smart card technology in recording and retrieving information in an economic and compact manner. It recognizes the need for concise, timely, autonomous and efficient bookkeeping of transactions related to machines during their life-time.

With reference back to FIG. 2, the local database 192 resides in the immediate vicinity of the system that interacts with the smart machine card. It has limited storage space that allows saving records of transactions. The remote/central database 193 has virtually unlimited capacity to store information on multiple smart machine cards. It usually does not reside in the vicinity of the smart machine card interface. The interaction and data exchange 194 among the smart machine card memory 191, local database 192, and remote/central database 193, are matters well known to those skilled in the art.

FIG. 4 shows that the smart machine card environment comprises four major hardware components. Data driver 3000 is a hardware component that includes a keyboard, printer and a terminal interface. It sends/receives commands and/or data to or from the CPU 3001 component. An example of such a component is a cash register or a point-of-sales computer. The CPU is a central processing unit that drives the smart machine card environment. It contains a microprocessor, random access memory (RAM), and a data bus for data transfer between the data driver 3000, and the smart machine card interface 3003. The central 3005 and local 3002 databases are optional and serve backup purposes. The smart machine card stores codes that can be decoded by the CPU 3001. The smart machine card interface 3003 is an interface device that can read and write to a smart machine card. This smart machine card interface is a device well known to those skilled in the art. The smart machine card interface issues low level commands and performs searches of certain character strings on a smart machine card. It also communicates with the CPU and responds to its commands. The central database is a large database that can store information about a large number of smart machine cards issued by the issuer of the smart machine card, machines that are serviced by the environment, individuals/organizations that are part of the smart machine card machine environment, as well as all information about events, owners and operators of a machine. The purpose of having such a database is primarily for backup but could also be used for accessing useful data to the CPU. The local database 3002 holds a small subset of the central database 3005. Communication between the CPU 3001 and central database 3005 can employ landlinks or wireless links such as through a satellite dish 3006.

FIG. 5 provides a high level overview of how data is collected, stored, retrieved, and processed about a machine using the smart machine card. With reference to both FIGS. 4 and 5 it can be seen that when a machine is involved in an event at a servicing location the smart machine card 3004 is scanned 2000 by the smart machine card interface. The CPU 3001 checks if the smart machine card can be read successfully and if the appropriate authorizations of the smart machine card and the user/point-of-service are present for executing the requested event 2001. If the smart machine card cannot be read or authorizations are inappropriate, the CPU 3001 prompts the user/point-of-service 3000 with a message 2015 indicating the problem. If the smart machine card is readable and the authorizations of the smart machine card and the user/point-of-service are valid the CPU 3000 checks if there are any scheduled events for the machine 2002. If any scheduled events are identified by the CPU 3001 through reading the smart machine card and employing other information, then the CPU 3001 commands the data driver 3000 to display the list of scheduled events 2050. If there are no scheduled events, the CPU 3001 sends commands to data driver 3000 to display a message indicating there are not scheduled events 2060. The CPU tests if the event that the machine is going through requires storing/retrieving data 2051. If no storing/retrieving are requested the CPU exits. Otherwise, the CPU tests if data storage is requested 2052. If no data storing is requested, then data retrieval from the smart machine card through the smart machine card interface is executed 2061. The CPU, upon retrieving the requested data, sends the data to the data driver for display 2062 and exits. If a data-storage operation is requested, the CPU 3001 formats the data and determines whether to store the information on the smart machine card, local database, or central database 2090. Then the CPU 3001 checks whether smart machine card, local or central databases have adequate memory to store the formatted data 2101. If the storage area is available, the CPU 3001 saves data into the smart machine card 2102. If the smart machine card does not have enough memory to store formatted data, the CPU 3001 issues an error message 2103 and exits. Despite the error message routine discussed above, it should be understood that in most applications according to this invention the smart machine card is intended to be the repository of all life history information for the machine; therefore, it should be designed with sufficient memory and/or with limited data entry categories.

Data Architecture

FIG. 3 sets forth the data structures utilized by a preferred embodiment of the smart machine card. The smart machine card of FIG. 3 provides a system which manages the plurality of transactions that relate to the machine. Each smart machine card is equipped to interact with the plurality of electronic and computing equipment through the smart machine card interface (i.e., reader/writter) and/or communication links. Interactions between the smart machine card and one or more computer databases provide for the maintenance/service of up-to-date book-keeping with regard to the various aspects related to the machine since its production, purchase or anytime thereafter.

FIG. 3 illustrates a multiple machine representation of the data-structures stored on a smart machine card. The number of the machines 109 stored on the smart machine card 106 determines the number of data structures, such as 107 and 108, that exist on the smart machine card. The first data structure 107 stores the information on the first machine while the data structure 108 stores the information on the last machine.

The smart machine card 106 stores and administers identification, servicing, functional, operational, and maintenance/service transaction records related to one or more machines during their life-time. These records include a plurality of entities selected from the top categories: machine identification information 100, machine maintenance/service information 101, machine operational information 102, machine associated debit/credit information 103, machine regulated performance information 104, machine warranty/insurance information 105, and machine scheduled service information 105b. These records are duplicated for as many machines as the smart machine card needs to contain.

The smart machine card 106 encompasses an architecture that is intended to cover the records that can be essential or useful to the identification, servicing, operation and maintenance of the machine. To serve this purpose, machine identification information 100 contains machine identification information that is sufficient to uniquely identify a particular machine from all other machines made before or after its production time. The identification information should desirably be sufficient to identify a machine without external information source; which means that a sufficient part of the identification is resident on the smart machine card and can be retrieved by a user by communication means alone without database, external communication (over a communication link), or a computer equipped with additional information. It should be understood that availability of one or more of the database, external communication (over a communication link), or a computer equipped with additional information can reduce the necessary identification information saved on the smart machine card. Furthermore, machine 100 includes ownership information of the machine and a unique servicing code.

More specifically, with reference to FIG. 6, the preferred embodiment includes the machine maker's identification code 200 which uniquely identifies the maker of the machine or the recognized legal entity that serves as a maker of the machine from all other makers of all other machines. The date of production of the machine 201 records the date/time which the machine was produced. The location of production of the machine 202 identifies the site at which the machine was produced. The model code of the machine 203 represents a unique code that is used to associate this machine with similar machines and uniquely distinguish this machine from machines that are not similar. The serial number of the machine 204 represents a unique number used to identify this particular machine, usually in the records of the producer of the machine. The smart machine card servicing code 205 represents a unique number assigned to the particular machine and therefore to its smart machine card by an authority over the smart machine card. A machine authorization level is associated 219 with each machine. The location of sale of the machine 220 records the site code where the machine was purchased by its owner. This authorization may allow a smart card interface or other computer-based smart machine card interface unit to recognize whether they should service the machine based on the validity of its authorization. The machine's operator identification information 206 is meant to identify information on entities (individuals, organizations, other hardware or software) that are recognized as operators of the machine. The primary owner name 207 represents the name of the owner of the machine (individuals, organizations, other hardware or software that can be owners). The primary owner identification number 208 is a number that uniquely identifies the owner from all other entities that may serve as owners. This number can, for example, be the social security number in the case of individuals. The primary owner's password 209 is a unique identifier known only to the owner of the machine. The date of purchase of the machine 210 records the date/time at which the machine was purchased by its current owner. The number of secondary operators 211 identifies the number of authorized operators of the machine. The secondary operators names 212 represents a list of all the names of the authorized operators of the machine. The secondary operators identification number 213 includes a list of all the numbers that uniquely identify each one of these operators from all other entities that may serve as operators. This number can, for example, be the social security number. The secondary operators passwords 214 is a list of unique identifiers that associate each password with a secondary operator, this password is known only to the particular secondary operator or an entity authorized by the owner. The machine's former owners' identification information 215 records ownership history for the machine. The number of former owners 215 allows identifying the records of previous owners, their names 216, identification number 217 and date of purchase 218 (also considered the ownership date) are recorded.

With reference back to FIG. 3, the category of machine scheduled service information 105b contains pre-scheduled recommended servicing transactions in the life-time of the machine. This category is meant to store the recommended future services to the machine as recommended by the maker, seller, warranty grantor or servicing agent of the machine. These scheduled services are commonly associated with landmarks in the life-time of the machine such as specific dates since beginning of its operation, specific dates since its last service, specific number of operations performed by the machine since its last service, etc.

FIG. 7a shows the number of scheduled service transactions 230 of the machine. The service transaction code 231 uniquely identifies the scheduled service to be performed to the machine. The service transaction date 232 identifies the date, if applicable, by which the scheduled service is recommended to be performed to the machine. The time code in the machine life-time 233 identifies a landmark, in respect to the life-time of the machine, by which the scheduled service transaction should be performed to the machine. The scheduled service recommender's identification 234 uniquely identifies the entity that recommends the scheduled service transaction 231. This entity may be the maker, seller, warranty grantor, regulator, servicing agent of the machine, etc. The scheduled service identification number 235 uniquely identifies the specific recording of the scheduled service transaction 231. This is usually generated by the recommender of the scheduled service as identified by 234.

As can be seen in FIG. 3, the category of machine maintenance/service information 101 contains a brief history of records related to periodic, scheduled, on-the-spot, recall, or emergency maintenance/service transactions that the particular machine has been involved in since its production/sale or anytime thereafter. Maintenance transactions can be sought by the machine (by software or hardware means) initiated by its owner, operator or maintainer, or by a recall of the maker or servicing agent of the machine. A maintenance/service transaction can involve either hardware or software upgrades on a periodic basis or due to servicing necessity as the machine is suspected not to be performing according to its intended operational plan or is recommended by a skilled technician to be serviced.

More specifically, with reference to FIG. 7, the preferred embodiment includes the service provider's identification number 250 that is a number that uniquely identifies the provider from all other providers. The date of the service 251 records the date and time of the service. It should be recognized that this date and time can be extended to encompass longer durations if needed. Provider's authorization code 262 indicates the types of access the provider can use to engage the smart card. The actual service provider's code 263 identifies the individual/organization within the service provider's organization. The service report information 252 represents various fields that record details on the nature of service. There are multiple records of the information provided in 253–261, in particular as many as hardware/software parts are involved in the transaction. The component maker's code 253 uniquely identifies the maker of the component. The component serial number 254 identifies the hardware/software component that is involved in the maintenance/service operation. A unique number is assigned to this component to uniquely identify it from all other components. The service code 255 uniquely identifies the service associated with the component involved in the maintenance/service operation. The cost of the component 256 stores the cost of the component without labor. The warranty/insurance code of component/labor 257 serves as a code to the extent of warranty/insurance associated with the maintenance/service operation in question in respect to the particular component and labor. The cost of labor of the part service is given by 258. The miscellaneous cost 259 represents any associated cost of the operation that is not reflected in the cost of the component or the labor associated with the maintenance/service operation. The cause of failure code 260 records the believed cause of the failure of the component. The time reference code in the machine life-time 261 records a code that uniquely identifies the maintenance/service operation in the life-time of the machine.

With reference back to FIG. 3, the category of machine operations information 102 contains a history of records related to the operations performed by the machine or on the machine by its owner or operator. These records are meant to capture information on machine operations that affect its life-time performance or its ongoing performance. This category can also be used to save the entire record of all operations regardless of impact on its life-time performance.

FIG. 8 shows the number of operational transactions stored on the smart machine card is given by 300. For each one of these transactions several data items are saved. The transaction code 301 uniquely identifies the particular transaction from any other operational transaction. The transaction date 302 records the date/time of the transaction. If the duration of the transaction is significant, two dates can be recorded, to identify beginning and ending of the transaction. The transaction cost 303 records the cost associated with the transaction. The transaction provider identification number 304 uniquely identifies the provider of the particular service. The provider can be individuals, organizations, machine, hardware or software. The transaction amount 305 records a quantity that may be associated with the operation if such exists in the context of the particular operation.

FIG. 3 shows that the category of machine associated debit/credit information 103 contains information on past, current and future debit/credit that is associated with the machine. This debit/credit can be updated over time so that it may reflect the amount of use of the machine, its performance, its service cost, etc. More specifically, with reference to FIG. 9, the preferred embodiment includes the debit/credit grantor's identification number 350 that is a number that uniquely identifies the provider from all other entities. The date of debit/credit issuance 351 records the date/time of the issuance of the current debit/credit by the grantor. The date of expiration of the debit/credit 352 records the date/time of the expiration of the debit/credit grantor's commitment to the debit/credit value. The debit/credit inclusion codes 353 identifies codes of inclusion to the debit/credit issued. This usually identifies the codes under-which the debit/credit will be respected by the grantor. The debit/credit exclusion codes 354 identifies codes of exclusions to the debit/credit. These are explicit codes under-which the debit/credit cannot be accepted. The debit/credit amount left on the machine's account balance 355 records the remainder value of the debit/credit, this is the value that can be used in current or future transactions. The debit/credit password 356 is a unique code provided to the machine or its operator by the grantor, generally, to guarantee that only the authorized entity (the machine, operator, etc.) is able to utilize the debit/credit associated with the smart machine card. The debit/credit type code 363 indicates the category type of debit/credit provided by the grantor. Debit transactions records 357 store the number of debit/credit related operations performed with respect to the machine. Each debit/credit operation is further elaborated by fields 358–362. The debit/credit transaction code 358 identifies the code of each debit/credit transaction recorded. This code is issued by the servicing/issuer of the smart machine card. The date/time of the transaction 359 records the date/time at which the debit/credit transaction occurred. If the duration of the transaction is significant, two dates/times can be used to identify beginning and ending of the transaction. The provider identification code 360 uniquely identifies the entity that provided the debit/credit operation with service. The debit/credit transaction amount 361 records the amount of the debit/credit used in the debit/credit operation. The service code 362 is a code used to identify this particular debit/credit transaction from all other debit/credit transactions and is generated by the provider of the debit/credit transaction.

FIG. 3 also shows that the category of machine regulated performance information 104 contains records identifying the different regulations for the performance and method of operation of the machine. These regulations can be created by the producer, owner, organization, city, county, district, state, federal, union or an authority concerned with the performance, deployment or operation of the machine. The regulation records on the smart machine card can be updated to reflect changes in regulation only by the authority that administers the regulation code. More specifically, with reference to FIG. 10, the preferred embodiment includes the regulator's identification code 400, that is a number that uniquely identifies the regulator from all other regulator entities. The machine identifier in regulatory records 401 is a code that uniquely identifies this particular machine from other machines registered with the regulator. Regulatory article numbers that apply to the machine 402 include the codes of all regulation articles that apply to the particular machine, its hardware, software, operation or performance. Regulatory compliance events 403 store the number of compliance events relative to the applicable codes 402 and the performance of the machine on each item. Each record encompasses information items 404–408. Regulatory code 404 identifies the code of the regulation in this record. Compliance amount 405 is a measure associated with the regulation represented in code 404 of the machine compliance with the applicable code 402. The date/time of occurrence of the regulatory compliance event is given in 406. The date/time of compliance 407 is a date provided by the examiner or enforcing authority of regulation code 404. Examiner's identification code 408 uniquely identifies the examiner or the authority that evaluated the regulation identified by code 404.

FIG. 3 shows the category of machine warranty/insurance information 105 contains records identifying the type and nature of warranty/insurance associated with the machine. The warranty/insurance can be given by an authority such as the producer, owner, organization, city, county, state, federal, union or a party that is recognized at the time of the production, sales or anytime thereafter of the machine. More specifically, with reference to FIG. 1 the preferred embodiment includes the warranty/insurance grantor's identification code 450 that is a number that uniquely identifies the provider from all other entities. The starting date of the warranty/insurance issuance 451 records the date/time of the issuance of the current warranty/insurance by the grantor. The date of expiration of the warranty/insurance 452 records the date/time of the expiration of the warranty/insurance grantor's commitment to the warranty/insurance terms. The warranty/insurance inclusion codes 453 identifies codes of inclusion to the warranty/insurance issued. This usually identifies the codes under which the warranty/insurance will be respected by the grantor. The warranty/insurance exclusion codes 454 identifies codes of exclusions to the warranty/insurance. The warranty/insurance service records number 455 identifies the number of service operations performed under the warranty/insurance issued to the machine that are stored on the smart machine card. Warranty service code 456 uniquely identifies the service operation performed under the warranty/insurance terms. The date of service 457 records the date/time of the warranty/insurance service. This date should be understood to encompass longer durations if needed. The provider identification code 458 uniquely identifies the entity that provide the warranty/insurance service from all entities that can provide warranty/insurance services.

Hardware

FIG. 12 is a hardware block diagram showing an illustrative hardware environment for the operation of the smart machine card. A smart machine card 120 is adapted for interfacing with a smart card interface unit 121 capable of reading and writing data. Smart card interface 121 includes a first communications interface which is equipped to communicate with the smart machine card 120. Such a first communications interface includes a smart card holder which is positioned in proximity to the smart machine card when data communications are desired. Accordingly, the smart card interface 121 may hold the smart machine card in a substantially stationary position while data communications are taking place, as contrasted with conventional sweeper type devices for credit cards, which are read-only devices and do not provide for bi-directional data communications. The design and construction of a suitable smart card interface 121 is a matter well known to those skilled in the art.

Smart card interface 121 includes a second communications interface for communicating with an electronic device such as a printer 122, a display 123 or a computing device such as a computer 124. Computing device 124 may be a conventional personal computer or a specially designed microprocessor-based device. The computer 124 is coupled to a user-interface 125, which may include a conventional keyboard, touchpad and a conventional video-display or a compatible form of display. The computer 124 is coupled to a conventional modem 126 adapted to communicate data over one or more conventional landline or wireless telephone communications links 127b. The computer 124 is also coupled to a conventional communication link 127c that allows the computer to directly exchange data. Conventional communication links 127c include serial or parallel links connected as a point-to-point, local or wide area network communications. This communication is a matter well known to those skilled in the art.

The computer 124 includes a conventional memory device (random access memory (RAM), read only memory (ROM), and/or a data storage device), into which is loaded a communication link table. The memory is organized to include a file update buffer for storing one or more files until such time as the file or files is or are transmitted from the computer terminal over a communications link. The communications link table contains a list of file identifiers. Each file identifier is associated with a communications link specification setting forth a category of communications link, and an access address for the communications link. Illustrative categories of communications include direct, dedicated, real-time, hardwired links, conventional landline telephonic links; conventional cellular telephonic links; point-to-point microwave links; and the like. The access address sets forth information which is sufficient to uniquely specify a given communications link. For example, in the case of a conventional landline or cellular telephonic link, the access address would include the telephone number of the link. In the case of a direct, dedicated, real-time, hardwired link, the access address would include a network address and/or the address of a communications port which couples the hardwired link to the computer terminal. Conventional landline telephone communications link 127b couples computer 124 to a corresponding centralized database computer such as first centralized smart machine card service center computer 129 through modem 128. It should be understood that more than one centralized smart machine card service center computer 129 can exist, and the choice of one center is for illustrative purposes only. The smart machine card service center serves as a backup and for universal tracking of events of smart machine cards.

The smart machine card service center 129 includes an information database 130 such as 130b that stores transactions, identification information etc. and a computer code database 131 such as 132 that stores and/or runs programs needed for the operation of the service center or the operation of the computer 124 servicing the smart machine card. The computer 124 serves the smart machine card environment and can communicate with the point-of-service computing unit 135 by a conventional communication link 127c employing a communication interface 127 or a cellular link via a cellular transceiver 134. The cellular transceiver connects to the computer 124 via a modem 133.

Taken together, smart card interface 121, printer 122, display 123, computer 124, user interface 125, modem 126 and communication interface 127 may be viewed as a remotely-situated user terminal. The terminal faciliates primarily local and remote reading/writting to the smart machine card. This environment, however, facilitates the exchange of data with remote computers systems via communication links.

FIG. 13 expands upon FIG. 12 and illustrates a preferred hardware environment for the operation of the smart machine card which allows storing and retrieving information on the smart machine card at point-of-service locations. Point-of-service locations include all locations at which the machine is rendered a service or examination. More specifically such locations include the point-of-purchase location of the machine, maintenance provider's outlets or their portable servicing environment, points where the machine is exposed to operations of types relevant to its records as detailed in the data-structure architecture of the smart machine card (see FIG. 3), warranty provider's outlets or their portable servicing environment and the grantors of the warranties outlets or their portable servicing environment, regulator's outlets or their portable servicing environment, and debit servicing outlets or their portable servicing environment and the grantors of such debit. Also, this preferred hardware environment for the operation of the smart machine card can be present at points at which the smart machine card can be used to print out its contents or trigger maintenance operations.

In FIG. 13, the smart machine card 783 includes information to be written to or read from it. The smart machine card interface unit 784 serves to communicate with the smart machine card 783 as defined earlier in FIG. 12 block 121. The smart machine card interface can directly connect to the plurality of a printer 789, display unit 790 or modem 791. Thus enabling printing of information, displaying the information to the user or initializing communications with a remote system via a telephonic line. Alternatively, a microprocessor-based computer 785 can be directly interfaced to the smart card interface and serve as its means of communication. This optional microprocessor-based computer 785 can in turn be connected to the plurality of a printer 789, display unit 790, modem 791, computer 780, cash register or other similar point-of-purhcase device 781, or a user interface 782 such as a keyboard, a mouse, touch screen and the like. Thus enabling printing of information, displaying the information to the user or initializing communications with a remote system via a telephonic line or executing programs locally. The communication links 786, 787 and 788 are of general nature such as point-to-point, local area network, wide area network, etc.

Protection

The smart machine card of this invention is designed to interact with various machines, individuals or organizations via its smart card interface. The records maintained on the smart machine card can be of vital importance to the machine, its owners or operators. These records presented in FIG. 3 are physically stored to accommodate the event types that can occur to the machine and need to be stored on the smart machine card. Each event type has particular levels of data management associated with it. Also, each event field is protected in a consistent way with the purpose served by the smart machine card.

FIG. 14 details the types of protection of files that are chosen for the preferred embodiment. Types of file protection 820 provides four types of protection for information stored on the smart machine card. A file designates a datum or data that are considered as a block or a directory that includes such data. These protections apply to the smart machine card during its life-time that begins immediately after it was initialized by the issuer to hold information for a particular machine. These protections should be interpreted in respect to the operations to be conducted at the point-of-service of the smart machine card (such as in FIG. 13). The first kind of protection 821 is designed for files that can be read only by the issuer of the smart machine card or an authority designated by the issuer. In order to read such files, a successful read operation has to be preceded by providing a valid password. Writing such files is strictly forbidden with exception to the initialization done by the issuer such as at the time of production or sale. The second kind of protection 822 is designed for files that can be freely read by a system that can interface with the smart machine card via a smart card interface. Writing such files is strictly forbidden with exception to the initialization done by the issuer such as at the time of production or sale. The third kind of protection 823 is designed for files that can be freely read by a system that can interface with the smart machine card via a smart card interface. Writing these files is allowed multiple times only by the issuer or an authority designated by the issuer. In order to accomplish this multiple writing, a password has to be provided prior to writing. The password has to match the password resident on the smart machine card that is associated with the particular event to be stored. The fourth kind of protection 824 is designed for files that can be freely read by a system that can interface with the smart machine card via a smart card interface. Writing these files is allowed only once. After their writing, they cannot be modified or rewritten. To accomplish this one-time writing, a password has to be provided prior to writing. The password has to match the password resident on the smart machine card that is associated with the particular event to be stored. These protections will be related to particular events discussed in connection with subsequent Figures. It should be understood that the protections described above can be further expanded into subclasses; our choice here is but one way to serve the protection of information and regulate access to it.

FIG. 15 details the different passwords that are resident on the smart machine card. There are four types of passwords 800 associated with different entities that reside on the smart machine card. The card issuer password 801 is initialized by the issuer at the time of smart machine card issuance, normally at times such as the time of production, sale or set-up of the particular machine(s) and the smart machine card it is designed to identify. Preferably, the password cannot be changed during the life-time of the smart machine card. The machine owner's password 802 is initialized by the issuer or an authority representing the issuer normally at the time of production or sale of the particular machine(s) and the smart machine card it is designed to identify. Once created, this password preferably can be rewritten only by the issuer or an authority representing the issuer. Such change can be needed if the owner's password is lost or the owner changes. The machine's password 803 is initialized by the issuer or an authority representing the issuer normally at the time of production or sale of the particular machine(s) and the smart machine card it is designed to identify. Once created, this password can be rewritten only by the issuer or an authority representing the issuer. The service provider's password 804 is initialized by the issuer or an authority representing the issuer normally at the time of production or sale of the particular machine(s) and the smart machine card it is designed to identify. Once created, this password preferably can be rewritten only by the issuer or an authority representing the issuer. Such change can be needed if the service provider's password has changed and the provider is to maintain its ability to service the machine and have records saved on the smart machine card. It should be appreciated that more passwords can be used to accommodate specific users or needs. FIG. 15 only shows a small set of the possible types of passwords which can be used in the practice of this invention to regulate the access to the smart machine card and the information it holds. These passwords can be viewed as authorization levels for representing entities interacting with the smart machine card.

File Layout

FIG. 16 shows the physical layout of data into files in a preferred embodiment. Machine identification information directory 700 represents a directory which holds all information and records that identify the machine, the owner, the operators, and prior owners of the machine. The number of machines associated with the smart machine card 713 indicates the number of records of machines associated with the particular smart machine card. There are as many records in directory 700 as recorded in the number of machines 713. There are three subdirectories representing permanent files 701, operators files 702 and former owners files 703. Permanent files 701 include information that uniquely identifies the associated machine(s) of the smart machine card. The information in this directory can be read freely and cannot be rewritten after the card has been issued as described in 822. Each record in 716, namely 704 holds the following information (discussed above in connection with FIG. 6): makers identification code 200, date of purchase 201, location of production 202, date of purchase 203, model code 204, serial number 205, smart machine card servicing code 206, the location of sale 220 and machine's password 219.

With reference to both FIGS. 6 and 16, operators files 702 include information that uniquely identifies the owner and operators of the machine with which the smart machine card is associated. The information in this directory 705 is protected in several modes. The primary owner name 207, identification number 208 and the date of purchase 210 can be freely read 706 and can be written multiple times by the issuer or an authority designated by the issuer. The primary owner password 707 is read-privileged but can be written multiple times by the issuer or an authority designated by the issuer. The number of operators of the machine 708 indicates the number or records of operators saved in this directory 705. Each one of this records, for example 711, includes the secondary operator name and identification number 709, protected as free for readings and multiple-times writing is allowed by the issuer or an authority designated by the issuer using a proper password. Secondary operators record includes also a secondary operator's password 710 which is read-privileged but can be written multiple times by the issuer or an authority designated by the issuer. There can be several operators, indicated by 708, having records of the kind described in 711. There are multiple operational files 705, a file for each machine stored on the smart machine card.

Former owners files 703 include information on former owners of the machine. The information in this directory can be read freely, but the writing is preferably once-only and can be executed by the issuer or an authority designated by the issuer using a proper password. The number of such owners 714 can be used to indicate the number of records on these former owners that are stored on the smart machine card. There are as many records of 712 as indicated by the number of former owners 714, each of these records 712 includes the former owner name 216, identification number 217 and former owner date of purchase 218 of the machine.

FIG. 17 shows the layout of files related to records of maintenance/service transactions. The directory of maintenance/service records stored on the smart machine card 720 contains the number of records of maintenance/service 723 stored on the smart machine card and the respective number of maintenance/service records such as 721 and 722. The number of records of maintenance/service 723 is freely read and multiply written with proper privileges. The writing can be executed by the issuer or an authority designated by the issuer using a proper password authorized. Each maintenance/service record such as maintenance/service record 721 contains a field identifying the service provider 724 (for example by a code), the actual service provider 730, the date of service 725 (including the time of transaction if applicable), the number of parts involved in the transaction 726 and a full record 729, such as 727 and 728, of these parts. Each part record such as 727 and 728 involve recording the following information related to the part. Specifically, these information items are: component serial number 253 (see FIG. 7), component maker code 254, service code 255, cost of component 256, warranty/insurance code on component and labor 257, labor cost 258, miscellaneous cost 259, cause of failure code 260 and time code in the machine life-time 261. It should be appreciated that the records described in 727 are but a select set of information on the maintenance/service transaction and they can be modified to accommodate the specifics of a machine and its maintenance/service.

FIG. 17a shows the layout of files related to records of scheduled services of the machine. The directory of scheduled services of the machine stored on the smart machine card 790 contains the number of scheduled services 798 of the machine such as 791 and 792. The number of scheduled services is freely read and multiply written with proper privileges. The writing can be executed by the issuer or an authority designated by the issuer using a proper password. Each scheduled service such as scheduled service 791 contains a field identifying the service transaction code 793, service transaction date 794, time code in the life-time of the machine 795, the identification code of the service recommender 796, and the scheduled service identification number 797 (see FIG. 7a).

FIG. 18 shows the layout of files related to records of operational transactions. The directory of operational records stored on the smart machine card 730 contains the number of records of operational transactions 738 stored on the smart machine card and the respective number of operational records such as 731 and 732. The number of operational records 738 is freely read and multiply written with proper privileges. The writing can be executed by the issuer or an authority designated by the issuer using a proper password. The writing of operational records is once-only by authorized entities. Each operation record such as operational record 731 contains a field identifying the transaction by code 733, the date of the transaction 734 (including the time of transaction if applicable), transaction cost 735, transaction provider identification code 736 and transaction amount 737 as detailed earlier in reference to FIG. 8. Operation record 732 is similar to operation record 731 but describes the last operation stored on the smart machine card.

FIG. 19 shows the layout of files related to debit/credit associated with the machine and recorded on the smart machine card. The directory of associated debit/credit records 740 stored on the smart machine card contains the number of debit/credit grantors to the machine and the respective number of debit/credit areas such as 742 and 743. The number of grantors 750 of debit/credit is freely read and multiply written with proper privileges. The writing can be executed by the issuer or an authority designated by the issuer using a proper password. Each debit/credit area such as debit/credit areas 742 and 743 contains four main files describing the aspects related to the debit/credit granted by the grantor and associated to the machine, namely debit/credit information records 744, number of debit/credit transactions 745, debit/credit password 746 and the stored records of these transactions 749. The debit/credit information records 744 as described in FIG. 9 are: debit/credit grantor identification code 350, debit/credit issue date 351, debit/credit expiration date 352, debit/credit inclusion codes 353, debit/credit exclusion codes 354, debit/credit amount left on balance 355, and debit/credit type code 363. The records 744 and 745 are freely read and multiply written with proper privileges. The writing can be executed by the issuer or an authority designated by the issuer using a proper password. The debit/credit password 746 is read-privileged and multiply written with proper privileges. The writing can be executed by the issuer or an authority designated by the issuer using a proper password. The number of debit/credit transactions 745 indicates how many debit/credit transactions are associated with debit/credit area 742 are recorded on the smart machine card. Each record, such as 747 and 748 comprises information detailed earlier in FIG. 9, specifically this information includes: debit/credit transaction code 358, date and time of the transaction 359, provider identification code 360, debit/credit transaction amount 361 and a service code 362. The information records 747, 748 and the like in 749 are freely read and one-time written with proper privileges. The writing can be executed by the issuer or an authority designated by the issuer using a proper password.

FIG. 20 shows the layout of files related to the regulated performance of the machine associated with the particular smart machine card. The directory of regulatory performance records stored on the smart machine card 750b contains the number of regulatory agencies or organizations of the machine 751 and the respective number of regulation areas such as 752 and 753. The number of regulatory agencies or organizations of the machine 751 is freely read and multiply written with proper privileges. The writing can be executed by the issuer or an authority designated by the issuer using a proper password. Each regulation area such as 752 and 753 contains four main files describing the aspects related to the regulation monitored by the agency with respect to the machine's operation, maintenance/service or performance, namely regulator's identification information and regulation that apply to the machine 754, number of compliance records 755, regulators password 756, and the compliance records of the respective number given by 755. These records were detailed in FIG. 10. The regulator's identification information and regulation that apply to the machine 754 include regulator's identification code 400, machine identifying code in regulatory records 401, applicable regulatory articles 402. The information stored in 754 is freely read and multiply written with proper privileges. The writing can be executed by the issuer or an authority designated by the issuer using a proper password. The number of compliance records 755 contains the number of records of compliance or uncompliance are associated with this particular regulator 752 with respect to the machine. The regulator's password 755b is read-privileged and multiply-written with proper privileges when done by the issuer or an authority designated by the issuer using a proper password.

The number of compliance records 758 indicates how many compliance transactions are associated with regulator's area 752 are recorded on the smart machine card. Each record, such as 756 and 757 comprises information detailed earlier in FIG. 10, and, specifically this information includes: regulation code 404, compliance amount 405, date/time of the transaction 406, date/time of compliance 407 and examiner identification code 408. The compliance records 756, 757 and the like in 758 are freely read and one-time written with proper privileges. The writing can be executed by the issuer or an authority designated by the issuer using a proper password.

FIG. 21 shows the layout of files related to the warranty/insurance associated with the machine as stored on the smart machine card. The directory of warranty/insurance records stored on the smart machine card 770 contains the number of warranty/insurance grantors to the machine 771 and the respective number of warranty/insurance areas such as 772 and 773. The number of warranty/insurance grantors to the machine 771 is freely read and multiply written with proper privileges. The writing can be executed by the issuer or an authority designated by the issuer using a proper password. Each warranty/insurance area such as 772 and 773 contains four main files describing the aspects related to the warranty/insurance records with respect to the machine's operation, maintenance/service or performance, namely information on the nature of the warranty/insurance given by the grantor with respect to the machine 774, number of warranty/insurance transaction records stored on the smart machine card 775, warranty/insurance's grantor password 776, and the warranty/insurance transaction records stored on the smart machine card. These records were detailed in FIG. 11. The warranty/insurance granted to the machine 774 includes: the grantor's identification code 450, starting date for the warranty/insurance 451, expiration date for the warranty/insurance 452, warranty/insurance inclusion codes 453, and warranty/insurance exclusion codes 454. The information stored in 774 is freely read and multiply written with proper privileges. The writing can be executed by the issuer or an authority designated by the issuer using a proper password. The number of warranty/insurance transactions records stored on the smart machine card 775 contains the number of warranty/insurance related transaction records provided with this particular warranty/insurance grantor 772 with respect to the machine(s). The warranty/insurance grantor's password 775b is read-forbidden and multiple-writings with proper privileges is allowed when done by the issuer or an authority designated by the issuer using a proper password. The number of warranty/insurance transactions records 778 indicates the number of recorded warranty/insurance transactions provided by the grantor. Each such record, such as 776 and 777 consists of information detailed earlier in FIG. 11, and, specifically this information includes: warranty/insurance service code 456, date and time of the transaction 457 and provider identification code 458. The warranty/insurance transactions records 776, 777 and the like in 778 are freely read and one-time written with proper privileges. The writing can be executed by the issuer or an authority designated by the issuer using a proper password.

Software Flow Diagrams

The hardware components interactions are carried out by a software layer. At its initial state the CPU 3001 (see FIG. 4) is ready to receive commands from the data driver 3000. With reference to FIG. 22, a user/point-of-service issues a command 3010 to the CPU through the data driver. The data driver command 3010 includes an event code and the user/point-of-service's profile. This profile includes information pertaining to this individual/organization that is creating the event. This information includes elements such as: individual/organization name, identification number, password, and authorization level. In addition, information about the event type and code is sent to the CPU.

The CPU 3001 acknowledges the request of the data driver and checks the status of the smart machine card 3011. It issues commands 3011 to the smart machine card interface 3003 to read the identification file from the smart machine card 3004. This file contains the smart machine card's serial number, issue date, start and end of effective date and an authorization level. If the file is not successfully read by the smart machine card interface, then the smart machine card interface sends a message to the CPU indicating an unsuccessful operation 3012. The CPU 3001 in turn formats and sends an appropriate error message to the data driver terminal for display to the user/point-of-service 3021. If the smart machine card interface successfully reads the file, then the data retrieved from this file is passed to the CPU 3013. The CPU verifies the validity of the card and/or the machine 3014. Particularly, the CPU 3001 identifies if the machine and the card are members of this smart machine card servicing environment. This is possibly done by accessing the local database and examining the serial number of the machine, the serial number of the card and the password of the machine. The CPU may also access the central database to complete this validation process, in case the smart machine card and/or machine are not listed in local database. If the verification process 3015 is not successful, then the CPU formats and sends an error message to the data driver terminal for display to the user/point-of-service 3022. If the verification process is successful then the CPU prompts the user/point-of-service to indicate whether a display of scheduled events is wanted 3016. If the user/point-of-service is interested in displaying scheduled events 3017, then the CPU issues commands to the smart machine card interface to read the scheduled services file in the smart machine card and the files are passed to the CPU 3019. The CPU searches the recorded events and determines based on these events and other information sources which maintenance events are due in the near future 3023. If the CPU finds no scheduled events 3021, it starts the processing of the new event 3026. Otherwise, the CPU formats the data to show scheduled date/time and sends it to the data driver terminal for display 3024. Once the information is displayed 3025, the CPU sends a command to the data driver to indicate that it is ready to receive further data on the new event 3026. Then the data driver acknowledges the CPUs readiness, it sends to the CPU complete information on the event and instructions on how it should be stored/retrieved. The CPU checks if the event requires recording data or not 3027. If the event does not require writing data, then the CPU issues commands to smart machine card interface to read requested data from the smart machine card 3038. Then the CPU receives this information and formats it for display on the data driver terminal 3039. The CPU also checks if the user/point-of-service has reading privileges of the requested information 3041. This is done by comparing the authorization level of the individual/organization that is requesting the data, to the security level on the event in the event file. If the user/point-of-service has no reading privileges to the requested data, the CPU sends the appropriate error message indicating that the user/point-of-service has no reading privileges to the data 3044. If the user/point-of-service has reading privileges, then the CPU and sends the formatted data to the data driver terminal for display 3042. In either case, the system exits 3073 after the read operation.

At 3027, if the requested event requires writing data to the smart machine card, local and/or central databases, then the CPU checks if the user/point-of-service has writing privileges to the requested medium 3028. If the user/point-of-service has no writing privileges, then the CPU sends an error message to the data driver terminal indicating that the user/point-of-service has no writing privileges 3035 and the operation is terminated in 3073. If, on the other hand, the user/point-of-service has writing privileges, the CPU formats the event data and proceeds to store the data on the smart machine card with possibly backing it up on local and/or the central databases 3030. In the first step, the CPU checks if there is sufficient space to store data onto the smart machine card 3031, 3032. If there is insufficient storage space on the smart machine card the CPU sends 3036 an error message to the data driver terminal and continues processing by pursuing data recording on local or central databases 3052. This message may include information on calling the issuer of the smart machine cards to issue a new smart machine card for the same machine. However, if there is enough storage space on the smart machine card, then the CPU sends the data to the smart machine card interface to be written onto the smart machine card's memory 3033. The smart machine card interface attempts to store data onto smart machine card memory. CPU tests 3050 if this storage process is unsuccessful, then the smart machine card interface sends an error message to the CPU, which formats and sends it to the user/point-of-service 3057. If, however, the process of storing data onto the smart machine card is successful 3051, then the CPU, tests if data should be stored in the local database 3052. If the answer is negative, then the CPU tests if a backup on a central database is required 3055. If data should be stored in the local database, then the system checks if the local database is able to receive data 3053. If the local database is unable to store the data then the CPU sends a messages to the data driver indicating this 3058. If the local database is able to store the data, then the CPU sends data to be stored 3054. Following that, the CPU checks if the data is required to be stored in the central database. If no data is required to be stored in the central database 3055, then the CPU executes the exit process 3073. If there is data to be stored to the central database, the CPU establishes connection with the central database 3056. The CPU checks if the central database is able to store data 3070. If the central database is unable to store data 3070 then the CPU formats an appropriate error message and sends it to the data driver terminal for display 3074, and executes the exit process 3073. The central database, in turn, saves the data 3071 and sends a messages about the end result of the data storage process. Finally, when all processing is concluded, the CPU sends a message to the data driver the process has ended, and that it is ready for a new transaction 3072 and exits 3073.

Applications

The invention can be used in a wide range of applications for diverse types of machines. These applications can employ the smart machine card as a passive recording device for events involving the machine or as an active device in credit/debit transactions or maintenance reminder assistance.

In the following applications, one could employ human resources to achieve the recording/retrieving task. However, increased efficiency, accuracy and productivity can be achieved by employing the proposed specialized smart machine card. It should be appreciated that the smart machine card offers unique features over the state-of-the-art of transactions recording and retrieval. These can be summarized as:

Mobility. The smart machine card is a miniature computer that can be physically transported effortlessly.

Handling. The smart machine card is as easy to handle as a credit card. The servicing hardware and software of the card give it the unique utility described here.

Cost. The smart machine card is only slightly more expensive than ordinary magnetic cards. The hardware used to interface to the card is far cheaper than that needed for a computer interface.

Functionality. The smart machine card can serve both as a compact/convenient note-book, and as an active device when used for alerting for overdue service transactions. Even when serving as a notebook, the smart machine card is able to record, at current memory capacity, about 4 pages of text.

The following are some sample application areas.

A. Motor vehicles

Motor vehicles play a central role in modern life. The costs of purchasing, operating and maintaining a motor vehicle are significant. However, there are no convenient means for the owner of a motor vehicle to record/retrieve transactions that involve a private vehicle. Some dealerships and service agents may maintain their own records of transactions involving a particular vehicle that they have serviced, but the information is not complete, standardized or immediately available to the vehicle's owner. Moreover, motor vehicle owners service their cars at diverse outlets depending on the vehicle needs, their budget, etc.

The smart machine card facilitates automatic recording of vehicle transactions on a card that belongs to the owner and is physically available for information retrieval upon demand (to be designated as a smart motor vehicle card). Using the smart motor vehicle card the owner is able to record the transactions into categories that reveal the expenses, amounts involved and a comprehensive status of the motor vehicle. More specifically, categories such as operational, maintenance/service, warranty/insurance, regulation compliance and debit/credit. Financial saving and operational efficiency of the vehicle can be achieved using the smart motor vehicle card.

FIG. 27 shows a possible implementation of the smart motor vehicle card. A smart motor vehicle card 4005 is associated with the motor vehicle 4000. The smart motor vehicle card 4005 is subject to read/write operations via a smart card interface 4006 which is driven by an on-board computer 4007. The on-board computer 4007 is connected to a user interface 4009 such as a keyboard, touch screen, etc. The on-board computer 4007 is also connected to a motor vehicle transceiver unit 4008 that converts and transmits/receives digital data using a wireless communication link 4004. A point-of-service for the car generally includes a computer such as 4001 that sends commands and data using the point-of-service transceiver unit 4002 that converts and transmits digital data using a wireless communication link 4003. An event involving the motor vehicle 4000 at a point-of-service location equipped with a computer 4001 is recorded on the smart motor vehicle card 4005 by a communication protocol as described earlier in this invention.

A simpler smart motor vehicle card operation environment will require the vehicle owner to hand over the smart motor vehicle card 4005 to the point-of-service operator to record transactions via a point-of-service smart card interface similar to 4006. Thus, reducing the vehicle's owner/operator involvement to physically carrying the smart motor vehicle card.

In addition to maintaining records of motor vehicles owned by individuals, smart motor vehicle cards can be used to record and retrieve information on motor vehicle, bus, rental, truck, military, heavy equipment fleets. In this case substantial enhancement in full record keeping translates into financial savings to the owners in addition to enhanced resource management.

B. Water Based Vehicles

Motor, jet and sailboats constitute another type of machinery that would benefit from this invention. Currently, the records of boat transactions are not kept in a straightforward effortless way, thus requiring the owner/operator to track all transactions and maintain records of diverse sources of information. A smart boat(s) card considerably simplifies the record keeping of transactions involving the boat. A method of operation similar to that described in FIG. 27 can readily be employed for boats.

C. Air Based Vehicles

Airplanes and helicopters often require high cost maintenance and repair, and are subject to frequent operational and service transactions. Current record keeping of these transactions is managed on paper forms or electronic databases. For the owner of a small plane, a smart airplane card is more convenient and allows transparent record keeping and easy information retrieval. A method of operation similar to that described in FIG. 27 can readily be adapted by airplanes and helicopters.

D. Medical Tools and Instruments

Hospitals and medical offices use considerable material resources in performing their day-to-day operations. Tools and devices used in these operations are often expensive and require specific handling procedures. Currently, considerable human investment is required to keep track of the transactions associated with handling of these devices; thus leading to increased material waste in the operation of these devices and costly labor investment. By employing a smart device card it is possible to effortlessly record/retrieve information on transactions in the life-time of a device and improve the tracking of the use of devices. Operation efficiency, cost and safety can increase from the proposed method of record keeping.

An illustrative scenario is a surgery event that involves several mechanical and electrical devices. Operations that affect the life-time and performance of devices can be recorded on a smart machine card and later used in performance assessment.

Hospitals and medical offices employ also very expensive instruments such as CAT scanners, magnetic resonance imaging (MRI) scanners, electronic microscopes, etc. that contribute directly to their high cost of operation. A smart instrument card, whether attached to the machine or separately kept can lead to more convenient full record keeping of transactions involving these instruments. Operational transactions on this expensive machinery are of considerable importance and are often manually or electronically recorded. A smart instrument card can simplify and automate the recording/retrieval of the transactions involving such instruments.

E. Office Equipment

The modern office commonly employs several pieces of machinery/equipment that are used for day-to-day operations. Photocopiers, computers, fax machines, scanners, printers, etc. are integral to its operations. Currently, records of maintenance or operational transactions of these pieces of equipment are kept on paper records or by the servicing agent of each machine. A smart equipment card can efficiently support recording/retrieving information on transactions involving the office equipment. For example, a smart equipment card can record all servicing transactions for all machines in the office as illustrated in FIG. 28.

In FIG. 28 an office set up with equipment such as a photocopier 4110, printer 4111, scanner 4112, fax machine 4113 and computer 4114 is provided. A servicing agent for one of these machines has a computer 4101 that is equipped with a transceiver 4102 that communicates via a wireless link 4103 or possibly a landlink with the office records unit 4100. The office records unit 4100 holds a smart office card 4105, smart card interface 4106, computer 4107, transceiver 4108 and can be additionally accessed through a user interface 4109. A servicing agent for one of these machines initiates an event of recording/retrieving information that is carried out on the office records unit 4100 in the manner described in the body of this invention.

Alternatively, an embodiment that minimizes the hardware of the office records unit 4100 can include just a smart office card interface 4106 that is physically used by an agent employing a computer 4101 to record information on the smart office card 4120 through a smart card interface 4121.

F. Miscellaneous Tools and Equipment

The workplace, from a workshop to factory, is often host to numerous tools and pieces of equipment. Tools as small as a screwdriver and as complex as a paper-mill, printing machine, robot-operated assembly line have significant roles in the workplace. A smart workplace card allows record keeping of the significant events that a tool or a machine undergo. On one hand, a simple tool such as a screwdriver requires very few records (e.g., identification, warranty, and regulation information). On the other hand a complex machine in an assembly line can easily take advantage of the information categories proposed for classification of events or custom design a smart workplace card to efficiently save its particular records of operation. An analogous set-up to that described for an office in FIG. 28 can easily achieve this goal.

G. Household Items

A house probably consumes the most expenditures in modern life. It includes appliances, furniture items and is composed of material objects that need periodic servicing (such as roofs, A/C and heat units etc.). Currently, tracking the records of transactions of the house items if done by the owner and requires efforts in recording and retrieving this information. An analogous set up to that described for an office in FIG. 28 can easily achieve this goal and make record keeping effortless.

Although the preferred embodiment of the invention describes the smart machine card as being physically in contact with the smart machine card interface unit during data exchange, current state-of-the-art in smart card technology allows contactless data exchange between a smart card and a transceiver unit (see for example U.S. Pat. Nos. 4692604, 4802080, 5241161 which are herein incorporated by reference). Therefore, it should be appreciated that the choice of contact-based smart card in the preferred embodiment is for illustrative purposes only and that a contactless smart card can be used as well to achieve the object of this invention.

While the invention has been described in terms of its preferred embodiments, those skilled in the art will recognize that the invention can be practiced with modification within the spirit and scope of the appended claims.

I claim:

1. A machine maintenance data card for recording machine maintenance events said machine maintenance data card comprising:

machine identification data files identifying at least one specific machine, said machine identification data files being write Protectable, thereby, selectively preventing said machine identification data files from being altered;

maintenance event data files containing a permanent history of maintenance event information for each said at least one specific machine, said maintenance event data files being write-once, read-many;

maintenance scheduling files identifying regularly scheduled maintenance for said machine;

entity identification data files which identify a specific entity and a relationship of said specific entity to said at least one specific machine, said entity identification data files being write privileged, thereby permitting selective writing to said entity identification files; and compliance records indicating whether regularly scheduled maintenance has been performed on said at least one specific machine responsive to said permanent history.

2. The data card of claim 1 wherein said machine identification data files identify a plurality of machines, and wherein each of said event data files and said entity identification data files pertain to one specific machine of said plurality of machines.

3. The data card of claim 1 wherein said specific machine is selected from the group consisting of land vehicles, water vehicles, and air vehicles.

4. The data card of claim 1 further comprising a microprocessor which interfaces with said event data files.

5. A machine maintenance data card for recording machine maintenance events said machine maintenance data card comprising:

machine identification data files identifying at least one specific machine, said machine identification data files being write Protectable, thereby selectively preventing said machine identification data files from being altered;

maintenance event data files containing a permanent history of maintenance event information for each said at least one specific machine, said maintenance event data files being write-once, read-many;

regulatory compliance scheduling files identifying regulatory compliance events for said machine;

entity identification data files which identify a specific entity and a relationship of said specific entity to said at least one specific machine, said entity identification data files being write privileged, thereby permitting selective writing to said entity identification files; and regulatory compliance records indicating whether regulatory compliance events have been performed on said at least one specific machine responsive to said permanent history.

6. A machine maintenance data card for recording machine maintenance events as recited in claim 5, wherein said regulatory compliance events relate to warranty or insurance events mandated by an authority such as producer, owner, organization, city, county, state, federal, union or a party that is recognized at the time of production, sales or any time thereafter.

* * * * *